US009785866B2

(12) United States Patent
Hua et al.

(10) Patent No.: US 9,785,866 B2
(45) Date of Patent: Oct. 10, 2017

(54) OPTIMIZING MULTI-CLASS MULTIMEDIA DATA CLASSIFICATION USING NEGATIVE DATA

(71) Applicant: Microsoft Technology Licensing, LLC., Redmond, WA (US)

(72) Inventors: Xian-Sheng Hua, Sammamish, WA (US); Jin Li, Bellevue, WA (US); Ishan Misra, Pittsburg, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 14/602,524

(22) Filed: Jan. 22, 2015

(65) Prior Publication Data

US 2016/0217349 A1    Jul. 28, 2016

(51) Int. Cl.
*G06K 9/00*    (2006.01)
*G06K 9/66*    (2006.01)
(Continued)

(52) U.S. Cl.
CPC ............ *G06K 9/66* (2013.01); *G06K 9/6218* (2013.01); *G06K 9/6269* (2013.01); *G06K 9/6284* (2013.01); *G06N 99/005* (2013.01)

(58) Field of Classification Search
CPC .. G06K 9/6218; G06K 9/6269; G06K 9/6284; G06K 9/66; G06N 99/005
See application file for complete search history.

(56) References Cited

U.S. PATENT DOCUMENTS 6,327,581 B1    12/2001    Platt
6,762,769 B2    7/2004    Guo et al.
(Continued)

FOREIGN PATENT DOCUMENTS

CN        103246893        8/2013
WO     WO2014009490 A1    1/2014

OTHER PUBLICATIONS

The PCT International Preliminary Report on Patentability mailed Jul. 26, 2016 for PCT application No. PCT/US2015/027408, 20 pages.
(Continued)

*Primary Examiner* — Nirav G Patel
(74) *Attorney, Agent, or Firm* — Schwegman Lundberg & Woessner, P.A.

(57) ABSTRACT

Techniques for optimizing multi-class image classification by leveraging negative multimedia data items to train and update classifiers are described. The techniques describe accessing positive multimedia data items of a plurality of multimedia data items, extracting features from the positive multimedia data items, and training classifiers based at least in part on the features. The classifiers may include a plurality of model vectors each corresponding to one of the individual labels. The system may iteratively test the classifiers using positive multimedia data and negative multimedia data and may update one or more model vectors associated with the classifiers differently, depending on whether multimedia data items are positive or negative. Techniques for applying the classifiers to determine whether a new multimedia data item is associated with a topic based at least in part on comparing similarity values with corresponding statistics derived from classifier training are also described.

20 Claims, 8 Drawing Sheets

(51) Int. Cl.
 *G06K 9/62* (2006.01)
 *G06N 99/00* (2010.01)

(56) References Cited

U.S. PATENT DOCUMENTS

| | | | |
|---|---|---|---|
| 6,915,025 B2 | 7/2005 | Wang et al. |
| 7,124,149 B2 | 10/2006 | Smith et al. |
| 7,164,798 B2 | 1/2007 | Hua et al. |
| 7,386,527 B2 | 6/2008 | Harris et al. |
| 7,558,764 B2 | 7/2009 | Abe et al. |
| 7,873,583 B2 | 1/2011 | Laxman et al. |
| 7,983,486 B2 | 7/2011 | Zhou |
| 8,086,549 B2 | 12/2011 | Qi et al. |
| 8,140,450 B2 | 3/2012 | Porikli et al. |
| 8,386,574 B2 | 2/2013 | Chidlovskii et al. |
| 8,509,478 B2 | 8/2013 | Haas et al. |
| 8,605,956 B2 | 12/2013 | Ross et al. |
| 8,645,380 B2 | 2/2014 | Wang et al. |
| 8,781,978 B2 | 7/2014 | Milenova et al. |
| 8,805,067 B2 | 8/2014 | Lee et al. |
| 2009/0290802 A1 | 11/2009 | Hua et al. |
| 2012/0254191 A1 | 10/2012 | Sanyal et al. |
| 2012/0263388 A1 | 10/2012 | Vaddadi et al. |
| 2014/0140610 A1 | 5/2014 | Tu et al. |
| 2014/0241623 A1 | 8/2014 | Wang et al. |
| 2014/0270350 A1 | 9/2014 | Rodriguez-Serrano et al. |
| 2014/0270495 A1 | 9/2014 | Tu et al. |
| 2015/0317389 A1 | 11/2015 | Hua et al. |
| 2015/0380009 A1 | 12/2015 | Chang et al. |
| 2016/0140451 A1* | 5/2016 | Li .................. G06N 99/005 706/12 |

OTHER PUBLICATIONS

Hautamaki et al, "Improving K-Means by Outlier Removal", SCIA, Jun. 2005, pp. 978-pp. 987, 10 pages.

Larsen et al, "Fast and Effective Text Mining Using Linear-time Document Clustering" KDD-99, 2009, pp. 16-pp. 23, 7 pages.

Office Action for U.S. Appl. No. 14/266,228, mailed on Sep. 21, 2016, Hua et al., "Learning Multimedia Semantics from Large-Scale Unstructured Data", 14 pages.

Wen et al., "Clustering User Queries of a Search Engine", WWW10, May 1-5, 2001, Hong Kong, pp. 162-pp. 168, 7 pages.

Xu et al., "Towards the Semantic Web: Collaborative Tag Suggestions", Collaborative web tagging workshop at WWW 2006, May 2006, pp. 1-pp. 8, 8 pages.

Bins, et al., "Feature Selection from Huge Feature Sets", In Proceedings of Eighth IEEE International Conference on Computer Vision, vol. 2, Jul. 7, 2001, 7 pages.

Cohen, et al., "Redundancy-Aware Topic Modeling for Patient Record Notes", PLOS One, vol. 9, No. 2, Feb. 13, 2014, 7 pages.

"International Search Report & Written Opinion Received for PCT Application No. PCT/US2015/027408", Mailed Date: Sep. 8, 2015, 11 Pages.

Li, et al., "Pachinko Allocation DAGStructured Mixture Models of Topic Correlations", In Proceedings of the 23rd international conference on Machine learning, Jun. 25, 2006, 8 pages.

Qiu, et al., "Objects Over the World", In Advances in Multimedia Information Processing—PCM 2008, Lecture Notes in Computer Science, Series vol. 5353, Dec. 9, 2008, 10 pages.

Sristy, et al., "Paired Feature Constraints for Latent Dirichlet Topic Models", In Proceedings of International Conference of Soft Computing and Pattern Recognition, Dec. 15, 2013, 6 pages.

Abe, et al., "An Iterative Method for Multi-class Cost-sensitive Learning", In Proceedings of the Tenth ACM SIGKDD International Conference on Knowledge Discovery and Data Mining, Aug. 22, 2004, 9 pages.

Aghajanian, et al., "Patch-based Within-Object Classi?cation", In Proceedings of IEEE 12th International Conference on Computer Vision, Sep. 27, 2009, 8 pages.

Antic, et al., "Learning Latent Constituents for Recognition of Group Activities in Video", In Proceedings of the European Conference on computer Vision, Sep. 6, 2014, 15 pages.

Brown, et al., "Multi-Image Matching using Multi-Scale Oriented Patches", "In Proceedings of the IEEE Computer Society Conference on Computer Vision and Pattern Recognition", Jun. 20, 2005, 8 pages.

Chen, et al., "NEIL: Extracting Visual Knowledge from Web Data", In IEEE International Conference on Computer Vision, Dec. 1, 2013, 8 pages.

Cheng, et al., "BING: Binarized Normed Gradients for Objectness Estimation at 300fps", In Proceedings of Computer Vision and Pattern Recognition, Jun. 24, 2014, 8 pages.

Divvala, et al., "Learning Everything About Anything: Webly Supervised Visual Concept Learning", In IEEE Conference on Computer Vision and Pattern Recognition, Jun. 23, 2014, 8 pages.

Jain, et al., "Active Learning for Large Multi-class Problems", In IEEE Conference on Computer Vision and Pattern Recognition, Jun. 20, 2009, 8 pages.

Jain, et al., "Fast Image Search for Learned Metrics", In Proceedings of IEEE Conference on Computer Vision and Pattern Recognition, Jun. 28, 2008, 8 pages.

Jain, et al. "Multi-Class Open Set Recognition Using Probability of Inclusion", In European Conference on Computer Vision, Sep. 6, 2014, 17 pages.

Juneja, et al., "Blocks that Shout: Distinctive Parts for Scene Classification", In IEEE Conference on Computer Vision and Pattern Recognition, Jun. 23, 2013, 8 pages.

Lei, et al., "Half-Against-Half Multi-class Support Vector Machines", In Proceedings of the 6th international conference on Multiple Classifier Systems, Jun. 13, 2005, 2 pages.

Li, et al., "Harvesting Mid-level Visual Concepts from Large-scale Internet Images", In Proceedings of IEEE Conference on Computer Vision and Pattern Recognition, Jun. 25, 2013, 8 pages.

Liu, et al., "Gathering Training Sample Automatically for Social Event Visual Modeling", In Proceedings of International Workshop on Socially-Aware Multimedia, Oct. 29, 2012, pp. 9-14.

Manzato, et al., "Automatic Annotation of Tagged Content Using Predefined Semantic Concepts", In Proceedings of 18th Brazilian symposium on Multimedia and the Web, Oct. 15, 2012, pp. 237-244.

Misra, et al., "Data-driven Exemplar Model Selection", In Proceedings of IEEE Winter Conference on Applications of Computer Vision, Mar. 24, 2014, 8 pages.

Setz, et al., "Can Social Tagged Images Aid Concept-Based Video Search?", In IEEE International Conference on Multimedia and Expo, Jun. 28, 2009, pp. 1460-1463.

Singh, et al., "Unsupervised Discovery of Mid-level Discriminative Patches", In Proceedings of the 12th European Conference on Computer Vision, Oct. 7, 2014, 14 pages.

Ulges, et al., "Learning Visual Contexts for Image Annotation from Flickr Groups", In IEEE Transactions on Multimedia, vol. 13, Issue 2, Apr. 2011, pp. 330-341.

U.S. Appl. No. 14/266,228, Hua, et al., "Learning Multimedia Semantics from Large-Scale Unstructured Data", filed Apr. 30, 2014.

Zhu, et al., "On the Sampling of Web Images for Learning Visual Concept Classifiers" In Proceedings of the ACM International Conference on Image and Video Retrieval, Jul. 5, 2010, pp. 50-57.

Yao, et al., "Strokelets a Learned Multi-Scale Representation for Scene Text Recognition", In Proceedings of IEEE Conference on Computer Vision and Pattern Recognition, Jun. 23, 2014, 8 pages.

Zhang, et al., "Active Learning through Notes Data in Flickr", In Proceedings of 1st ACM International Conference on Multimedia Retrieval, Apr. 17, 2011, 8 pages.

Chen, et al., "Action recognition through discovering distinctive action parts", Journal of the Optical Society of America A, vol. 32, No. 2, Jan. 8, 2015, pp. 173-185, 13 pages.

Chen, et al, "Learning a Compact Latent Representation of the Bag-of-Parts Model", 2014 IEEE International Conference on Image Processing (ICIP 2014): Paris, France, Oct. 27-30, Oct. 1, 2014, pp. 5926-5930, 5 pages.

(56) References Cited

OTHER PUBLICATIONS

Ciaramita, et al., "Supersense Tagging of Unknown Nouns in WordNet", In Proceedings of the 2003 Conference on Empirical Methods in Natural Language Processing, Jul. 11, 2003, pp. 168-175.
Crammer, et al., "Ultraconservative Online Algorithms for Multiclass Problems", In Proceedings of 14th Annual Conference on Computational Learning Theory, Jul. 16, 2001, pp. 99-115.
Hariharan, et al., "Discriminative Decorrelation for Clustering and Classification", Computer Vision ECCV, Oct. 7, 2012, pp. 459-472, 14 pages.
"International Search Report and Written Opinion for PCT/US2015/067554", Mar. 24, 2016, 16 pages.
"International Search Report and Written Opinion Issued in PCT Application No. PCT/US2016/013497", Mailed Date: Apr. 21, 2016, 14 pages.
Jumutc, et al., "Multi-Class Supervised Novelty Detection", In Proceedings of IEEE Transactions on Pattern Analysis and Machine Intelligence, vol. 36, Issue 12, Jun. 3, 2014, pp. 2510-2523.
Sicre, et al., "Discovering and Aligning Discriminative Mid-level Features for Image Classification", International Conference on Pattern Recognition, IEEE Computer Society, US, Aug. 24, 2014, pp. 1975-1980, 6 pages.
Office Action for U.S. Appl. No. 14/266,228, mailed on Jan. 12, 2017, Hua et al., "Learning Multimedia Semantics from Large-Scale Unstructured Data", 15 pages.
International Preliminary Report on Patentability for PCT/US2015/067554, dated Apr. 10, 2017, 21 pages.
F. Moosmann et al., "Randomized Clustering Forests for Image Classification", IEEE Trans. on Pattern Anal. and Mach. Intel., vol. 30, No. 9, Sep. 2008, pp. 1632-1646, 15 pages.
Office Action for U.S. Appl. No. 14/602,494, dated Jan. 23, 2017, Misra et al., "Optimizing Multi-Class Image Classification Using Patch Features", 7 pages.
Office Action for U.S. Appl. No. 14/266,228, dated May 18, 2017, Hua et al., "Learning Multimedia Semantics from Large-Scale Unstructured Data", 14 pages.
Second Written Opinion Issued in PCT Application No. PCT/US2015/067554, dated Dec. 22, 2016, 7 Pages.
Rokach et al., "Clustering Methods", in Data Mining and Knowledge Discovery Handbook, Springer US, 2005, pp. 321-352. 32 pages.

* cited by examiner

OPTIMIZING MULTI-CLASS MULTIMEDIA DATA CLASSIFICATION USING NEGATIVE DATA

BACKGROUND

Computer vision may include object recognition, object categorization, object class detection, image classification, etc. Object recognition may describe finding a particular object (e.g., a handbag of a particular make, a face of a particular person, etc.). Object categorization and object class detection may describe finding objects that belong in a particular class (e.g., faces, shoes, cars, etc.). Multimedia data classification may describe assigning an entire multimedia data item to a particular class (e.g., location recognition, texture classification, etc.). Computerized object recognition, detection, and/or classification using multimedia data is challenging because some objects and/or multimedia data items may not belong to a particular class but may be (mis)classified as a label associated with the particular class despite not belonging to the particular class. Accordingly, techniques for accurately determining that an object and/or multimedia data item is not part of a class (i.e., rejecting an object and/or multimedia data item) are useful for improving classification accuracy.

Current techniques for rejecting objects and/or multimedia data items are error prone. One technique for rejecting objects and/or multimedia data items leverages thresholds to reject any object and/or multimedia data item with a post-classification value below a predetermined threshold. However, often times this threshold technique is inaccurate and objects and/or multimedia data items that are associated with a topic are mistakenly rejected. For instance, a user may input a photo of a chi-poo for classification in a "dog" class. Because the chi-poo is difficult to classify, the classifier may output classification values below a predetermined threshold indicating that the chi-poo is not associated with any label in the "dog" class. The chi-poo is a dog, however, and accordingly, such classification is inaccurate.

Other techniques (e.g., n+1 classification techniques) collect positive and negative data. Positive data may include objects and/or multimedia data items that are associated with labels in a class (e.g., dogs). Negative data may include objects and/or multimedia data items that are not associated with any labels in the class (e.g., not a dog). Such techniques train a classifier to recognize objects and/or multimedia data items associated with each of the labels in the class (e.g., recognizing an object and/or multimedia data item is a particular type of dog) and an additional class that is not associated with any label in the class (e.g., recognizing the object and/or multimedia data item is not a dog). However, the negative data may comprise of a very diverse set of labels and classes and accordingly, a single model may not accurately identify objects and/or multimedia data items that do not belong to labels in the class (e.g., dogs).

SUMMARY

This disclosure describes techniques for optimizing multi-class multimedia data classification by leveraging negative multimedia data items to train classifiers. The techniques described herein leverage negative multimedia data items to optimize the multi-class multimedia data classification by improving the accuracy in classifying incoming multimedia data items and reducing an amount of computational resources used for training classifiers. Leveraging negative multimedia data items improves classifier accuracy by training classifiers to be more discriminative between multimedia data items that are associated with a topic (e.g., class, category, etc.) and multimedia data items that are not associated with the topic.

The systems and methods herein describe accessing a plurality of multimedia data items that may include positive multimedia data items and negative multimedia data items for training classifiers. Positive multimedia data items may include multimedia data items that belong to a label associated with a topic. Negative multimedia data items may include multimedia data items that do not belong to the topic. The system may iteratively test the classifiers using positive multimedia data and negative multimedia data and may update model vectors associated with the classifiers differently, depending on whether multimedia data items are positive or negative. In one example, the system may access a negative multimedia data item of a plurality of negative multimedia data items. The system may extract features from the negative multimedia data item and apply a classifier to the features to determine similarity values corresponding to labels associated with the topic. The classifier may include a plurality of model vectors each corresponding to one of the labels associated with the topic. The system may determine that a similarity value that is associated with a particular label is greater than a statistic that is associated with the particular label. The statistic may derive from training the classifier using positive multimedia data items. Based at least in part on determining that the similarity value is greater than the statistic, the system may adjust an individual model vector corresponding to the particular label to update the classifier to more accurately determine whether multimedia data items belong to the topic. In additional or alternative examples, the system may access a positive multimedia data item and may update the classifier using a different process.

The systems and methods herein further describe applying the classifier to classify new multimedia data items. The system may leverage the statistics collected while training the classifier for classifying the new multimedia data items. The system may receive a new multimedia data item and may extract features from the new multimedia data item. The system may apply the classifier to the features to generate similarity values corresponding to each of the labels associated with a topic and may compare the similarity values with the statistics corresponding to each of the labels. Base at least in part on comparing the similarity values with the corresponding statistics, the system may determine whether the new multimedia data item is associated with the topic and may output a recognition result identifying which label of the topic is associated with the new multimedia data item.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
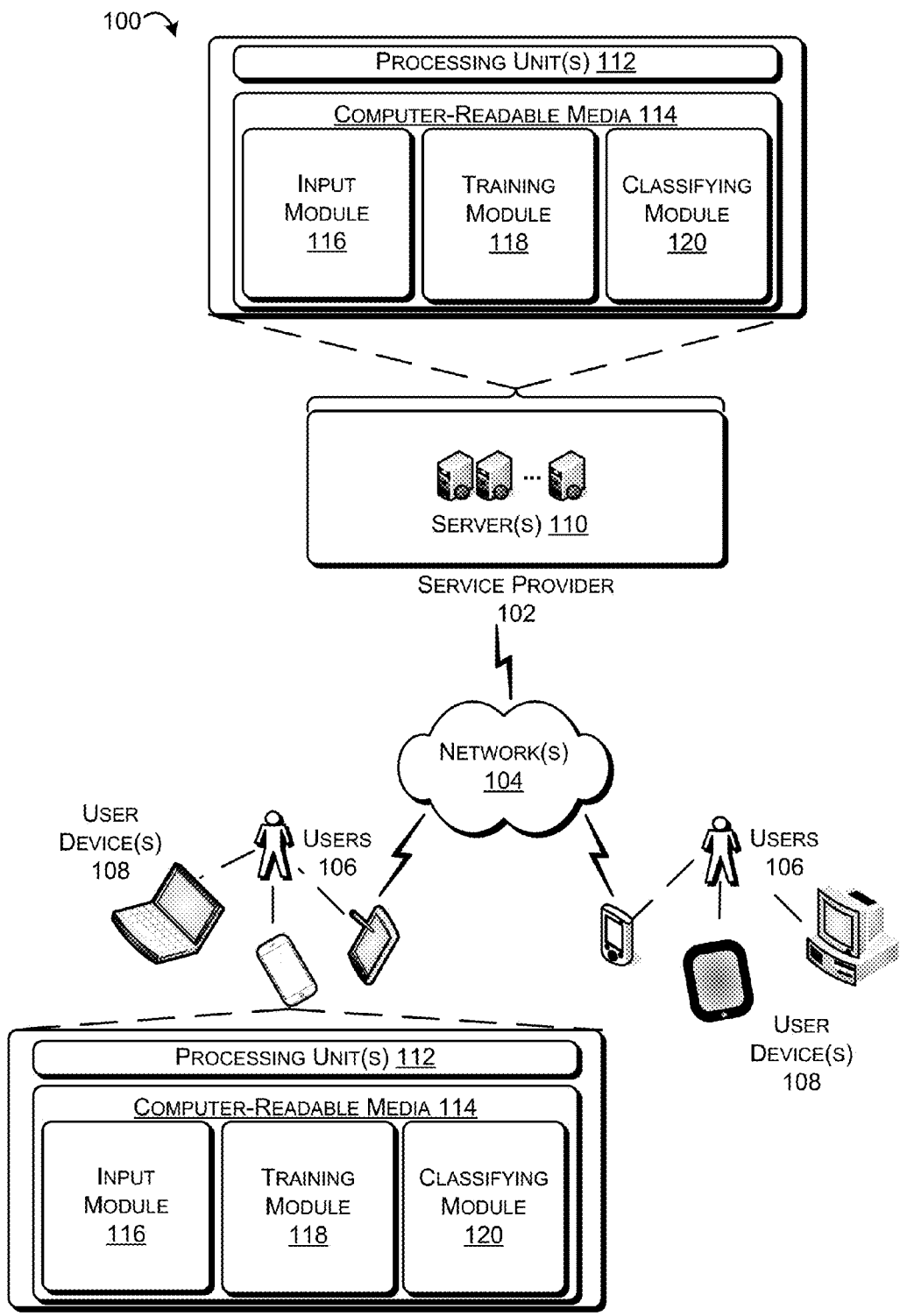
FIG. 1 is a diagram showing an example system for training classifiers from positive multimedia data items and negative multimedia data items and applying the trained classifiers to classify new multimedia data items.

Computer vision object (e.g., people, animals, landmarks, etc.), texture, and/or scene classification of multimedia data items (e.g., photo, video, etc.) may be useful for several applications including photo and/or video recognition, image searching, product related searching, etc. Current computerized object recognition, detection, and/or classification using multimedia data frequently misclassifies objects and/or multimedia data items as belonging to a particular topic when, in fact, they do not belong to the topic at all. For instance, current techniques may classify a computer as a particular dog when, in fact, the computer is not a dog. Accordingly, techniques for accurately determining that an object and/or multimedia data item is not part of a topic (i.e., rejecting an object and/or multimedia data item) are useful for improving recognition, detection, and/or classification accuracy.

One technique for rejecting objects and/or multimedia data items that are not associated with a topic leverages thresholds to reject any object and/or multimedia data item with a post-classification value below a predetermined threshold. However, often times the results are inaccurate and objects associated with a topic are mistakenly rejected. Such misclassification decreases recognition, detection, and/or classification accuracy and is inconvenient for users. Other techniques (e.g., n+1 classification techniques) collect positive data and negative data. The positive data may be associated with n topics. The negative data may be associated with an additional (+1) topic. The n+1 classification techniques train classifiers to recognize objects and/or multimedia data items associated with n labels in a topic and objects and/or multimedia data items that are associated with the additional topic (+1). However, the negative data that makes up the additional topic (+1) may be associated with data from many labels and topics. Accordingly, the model may not accurately identify objects and/or multimedia data items in the additional topic (+1).

Techniques described herein optimize multi-class multimedia data classification by leveraging negative multimedia data items to improve the accuracy of classifiers and the speed of training the classifiers. The systems and methods described herein may be useful for training classifiers and classifying multimedia data items using the classifiers. Such classification may be leveraged for several applications including object recognition (e.g., finding a particular object such as a handbag of a particular make, a face of a particular person, etc.), object categorization or class detection (e.g., finding objects that belong in a particular class), and/or multimedia data item classification (e.g., assigning an entire multimedia data item to a particular class). For instance, such classification may be useful for photo and/or video recognition, image searching, product related searching, etc. The techniques described herein leverage negative multimedia data items to improve accuracy in classifying incoming multimedia data items. Leveraging negative multimedia data items for training classifiers results in fewer rejections such that the classifiers may be less likely to reject positive multimedia data items from topics to which they appropriately belong. Additionally, using negative multimedia data items for training classifiers optimizes the multi-class multimedia data classification by reducing the amount of computational resources used for training classifiers. For instance, using negative multimedia data items increases training efficiency by causing the classifier to converge more quickly than with current techniques.

For the purpose of this discussion, multimedia data items may include still images (e.g., photos), videos, animations, etc. In other examples, multimedia data items may include audio or speech files. Multimedia data items may include a combination of text, visual, and/or audio data in presentations, webpages, microblogs, etc. In at least one example, the multimedia data items may include multimedia data items associated with a label, as described below. The multimedia data items may be semantically associated with the labels such that the labels are representative of a meaning and/or subject of the multimedia data items.

The systems and methods describe training classifiers based at least in part on positive multimedia data items and negative multimedia data items. In some examples, the positive multimedia data items and negative multimedia data items may be available on the Internet. The positive multimedia data items may be data items that collectively are semantically associated with a topic. The negative multimedia data items may be data items that are not semantically associated with the topic. The topics described herein may be general concepts (e.g., class, category, etc.) that are hierarchically related to the labels described herein. In at least one example, a set of labels comprises a topic. For example, a topic may be a general concept such as "Seattle Attractions," "Animals," "Sea Life of Hawaii," etc. Each of the positive multimedia data items may be associated with a label in the set of labels that comprise the topic.

Labels may represent sub-topics, sub-concepts, or sub-categories of the topics. That is, labels correspond to one particular entity (e.g., animal, plant, attraction, etc.). Labels may be more specific than topics. Examples of labels that may be associated with the topic "Seattle Attractions" include "Space Needle," "Seattle Great Wheel," "Woodland Park Zoo," "Experience Music Project Museum," etc. Examples of labels that may be associated with the topic "Animals" may include "giraffe," "bear," "monkey," "moose," etc. Examples of labels that may be associated with the topic "Dogs" may include "Poodle," "Griffon," "Labrador Retriever," or "Chihuahua."

In at least one example, the system described herein may access a corpus of multimedia data items. The corpus of multimedia data items may include positive multimedia data items. Each positive multimedia data item in the corpus of multimedia data items may be associated with at least one label in a set of labels associated with the topic. The system may extract features from individual positive multimedia data items and may train the classifier based at least in part on the features. The classifier may include a plurality of model vectors that each corresponds to one of the labels in the set of labels associated with the topic. The model vectors may each represent a location of a particular label in a high dimensional feature space. The system may collect statistics corresponding to each of the labels. The statistics may be based at least in part on iteratively processing individual multimedia data items using the classifier. The system may also use the positive multimedia data items for updating the classifier based at least in part on iteratively testing the classifier.

The corpus of multimedia data items may also include negative multimedia data items. The negative multimedia data items may represent multimedia data items that are not associated with a same topic as the positive multimedia data items and accordingly, are not associated with any of the labels in the set of labels associated with the topic. The system may extract features from the negative multimedia data items and apply the classifier to the extracted features. Based at least in part on applying the classifier to the negative multimedia data items, the system may output similarity values that correspond to each label in the set of labels. The system may compare the similarity values with the statistics for each of the labels, and based at least on the comparing, the system may update individual model vectors to refine the classifier.

For the purpose of this discussion, similarity values represent a distance between a feature vector extracted from a multimedia data item and a model vector for a label in a set of labels associated with a topic. As described above, both the feature vector and the model vector may represent high dimensional vectors. Accordingly, the distance described above may represent a distance between the feature vector and model vector in a high dimensional space. The distance may be computed using a dot product, etc. Relatively large similarity values may correspond to labels that are closest in distance to a multimedia data item (e.g., most similar to the multimedia data item). Relatively small similarity values may correspond to labels that are farthest away from a multimedia data item (e.g., the most dissimilar to the multimedia data item).

The systems and methods herein further describe applying the classifier to classify new multimedia data items. In at least one example, a user may input a new multimedia data item into the trained system described herein. The system may apply the classifier to classify the new multimedia data item. Based on comparing the similarity values generated from applying the classifier, the system may determine whether the new multimedia data item is associated with the topic. If the system determines that the new multimedia data item is associated with the topic, the system may classify the new multimedia data item by determining which label of the set of labels is associated with the new multimedia data item and also determine a confidence score associated with the label. Additionally, the system may output a recognition result to the user. The recognition result may include at least one label that may be associated with the new multimedia data item.

Illustrative Environment

The environment described below constitutes but one example and is not intended to limit application of the system described below to any one particular operating environment. Other environments may be used without departing from the spirit and scope of the claimed subject matter. The various types of processing described herein may be implemented in any number of environments including, but not limited to, stand alone computing systems, network environments (e.g., local area networks or wide area networks), peer-to-peer network environments, distributed-computing (e.g., cloud-computing) environments, etc. In some examples, all of the processing may be implemented on a single device. In other examples, at least some of the processing may be implemented on two or more devices.

FIG. 1 is a diagram showing an example system 100 for training classifiers from positive multimedia data items and negative multimedia data items and applying the trained classifiers to classify new multimedia data items. More particularly, the example operating environment 100 may include a service provider 102, one or more network(s) 104, one or more users 106, and one or more user devices 108 associated with the one or more users 106.

As shown, the service provider 102 may include one or more server(s) 110, which may include one or more processing unit(s) 112 and computer-readable media 114. Executable instructions stored on computer-readable media 114 can include, for example, an input module 116, a training module 118, and a classifying module 120, and other modules, programs, or applications that are loadable and executable by processing units(s) 112 for classifying multimedia data items. The one or more server(s) 110 may include devices. The service provider 102 may be any entity, server(s), platform, etc. that may train classifiers based at least in part on positive multimedia data items and negative multimedia data items and leverage the trained classifiers for classifying new multimedia data items. The service provider 102 may receive a corpus of multimedia data items associated with a topic and may extract features from individual multimedia data items in the corpus. The service provider 102 may train a classifier based at least in part on the features. The service provider 102 may leverage the positive multimedia data items and negative multimedia data items for updating the classifier. The service provider 102 may use the classifier to classify new multimedia data items input by users 106.

In some examples, the network(s) 104 may be any type of network known in the art, such as the Internet. Moreover, the users 106 may communicatively couple to the network(s) 104 in any manner, such as by a global or local wired or wireless connection (e.g., local area network (LAN), intranet, etc.). The network(s) 104 may facilitate communication between the server(s) 110 and the user devices 108 associated with the users 106.

In some examples, the users 106 may operate corresponding user devices 108 to perform various functions associated with the user devices 108, which may include one or more processing unit(s) 112, computer-readable storage media 114, and a display. Executable instructions stored on computer-readable media 114 can include, for example, the input module 116, the training module 118, and the classifying module 120, and other modules, programs, or applications that are loadable and executable by processing units(s) 112 for classifying multimedia data items. Furthermore, the users 106 may utilize the user devices 108 to communicate with other users 106 via the one or more network(s) 104.

User device(s) 108 can represent a diverse variety of device types and are not limited to any particular type of device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

As described above, the service provider 102 may include one or more server(s) 110, which may include devices. Examples support scenarios where device(s) that may be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

As described above, device(s) that may be included in the one or more server(s) 110 and/or user device(s) 108 can include any type of computing device having one or more processing unit(s) 112 operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, the input module 116, the training module 118, and the classifying module 120, and other modules, programs, or applications that are loadable and executable by processing units(s) 112. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZyXEL® or Altera® that includes a CPU course embedded in an FPGA fabric.

Device(s) that may be included in the one or more server(s) 110 and/or user device(s) 108 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Devices that may be included in the one or more server(s) 110 can also include one or more network interfaces coupled to the bus to enable communications between computing device and other networked devices such as user device(s) 108. Such network interface(s) can include one or more network interface controllers (NICs) or other types of transceiver devices to send and receive communications over a network. For simplicity, some components are omitted from the illustrated system.

Processing unit(s) 112 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) 112 may execute one or more modules and/or processes to cause the server(s) 110 to perform a variety of functions, as set forth above and explained in further detail in the following disclosure. Additionally, each of the processing unit(s) 112 may possess its own local memory, which also may store program modules, program data, and/or one or more operating systems.

In at least one configuration, the computer-readable media 114 of the server(s) 110 and/or user device(s) 108 may include components that facilitate interaction between the service provider 102 and the users 106. For example, the computer-readable media 114 may include the input module 116, the training module 118, and the classifying module 120, as described above. The modules (116, 118, and 120) can be implemented as computer-readable instructions, various data structures, and so forth via at least one processing unit(s) 112 to configure a device to execute instructions and to perform operations implementing training classifiers from positive multimedia data items and negative multimedia data items. Functionality to perform these operations may be included in multiple devices or a single device.

Depending on the exact configuration and type of the server(s) 110 and/or the user devices 108, the computer-readable media 114 may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communication media consisting solely of a modulated data signal, a carrier wave, or a propagated signal, per se.

Training Classifiers

Figure 2:
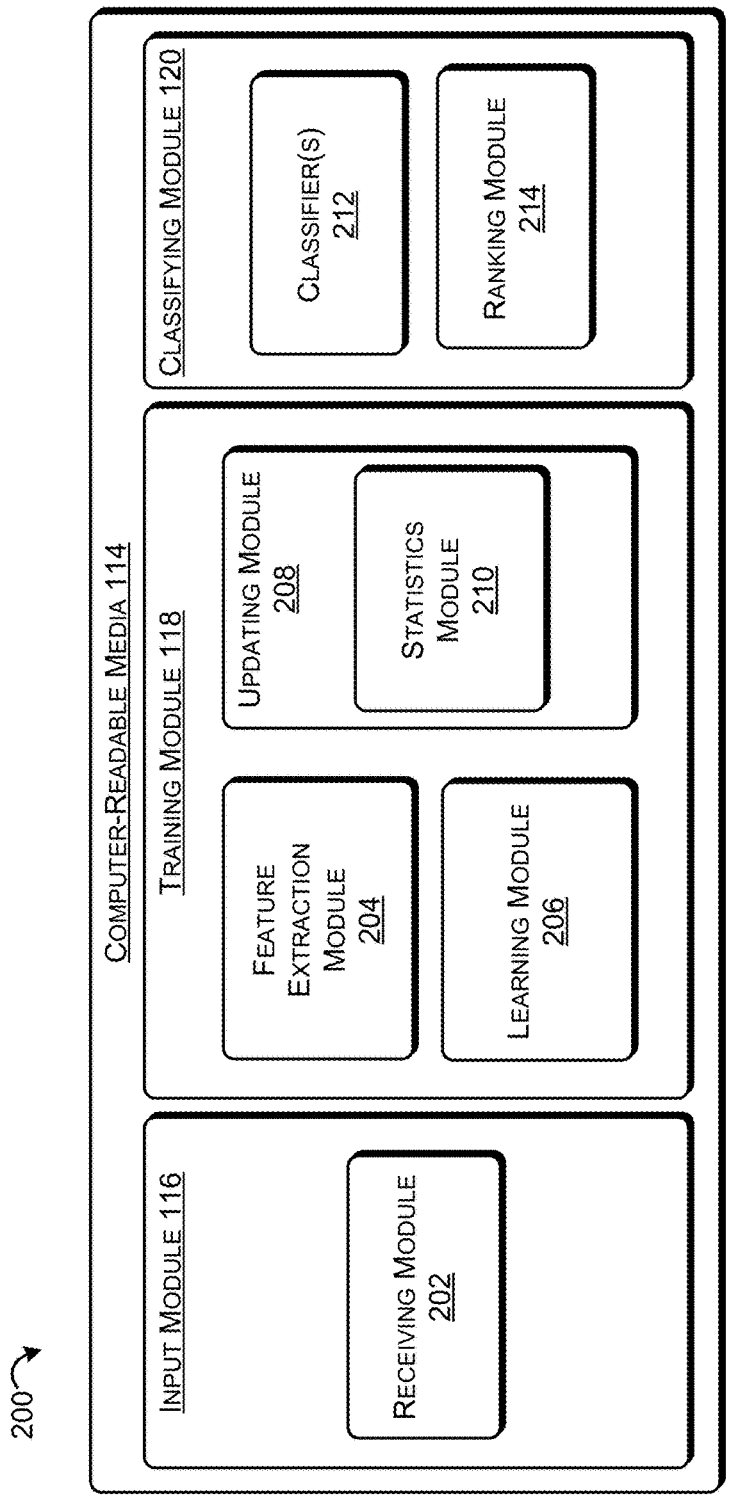
FIG. 2 is a diagram showing additional components of the example system for training classifiers from positive multimedia data items and negative multimedia data items and applying the trained classifiers to classify new multimedia data items.

FIG. 2 is a diagram showing additional components of an example system 200 for training classifiers from positive multimedia data items and negative multimedia data items and applying the trained classifiers to classify new multimedia data items. As shown in FIGS. 1 and 2, the system 200 may include the input module 116, the training module 118, and the classifying module 120.

The input module 116 may receive multimedia data items. As described above, the multimedia data items may include positive multimedia data items and negative multimedia data items. In at least one example, the receiving module 202 may receive the plurality of multimedia data items based at least in part on sending one or more queries. A query may be a query for a single label or a plurality of labels. A query may be a textual query, multimedia data item query, etc. For example, the query may include words used to identify a label (e.g., "orca whale") and related words and/or phrases (e.g., "killer whale," "blackfish," etc.). In at least one example, a user 106 may include optional modifiers to the query. For example, if a user wishes to use "jaguar" as a query, a user may modify the query "jaguar" to include "animal." In such examples, the resulting corpus of multimedia data items may include jaguar animals but may exclude Jaguar® cars. The input module 116 may send the one or more queries to one or more search engines, social-networking services, blogging services, and/or other websites or web services, as described above. In order to collect a corpus of positive multimedia data items and negative multimedia data items, the input module 116 may send a query associated with a topic and/or one or more queries associated with one or more labels associated with the topic to collect the positive multimedia data items and may send a plurality of queries associated with topics and/or labels that are not associated with the topic to collect the negative multimedia data items. The receiving module 202 may receive the plurality of multimedia data items based at least in part on sending the one or more queries.

In at least one example, the multimedia data items may be available on the Internet. For example, for any query associated with a label, multimedia data items may be extracted from data available on the Internet in search engines, social-networking services, blogging services, data sources, and/or other websites or web services. Examples of search engines include Bing®, Google®, Yahoo! Search®, Ask®, etc. Examples of social-networking services include Facebook®, Twitter®, Instagram®, MySpace®, Flickr®, YouTube®, etc. Examples of blogging services include WordPress®, Blogger®, Squarespace®, Windows Live Spaces®, WeiBo®, etc. Examples of data sources include ImageNet (maintained by Stanford University), open video annotation project (maintained by Harvard University), etc.

In some examples, the multimedia data items may be accessible by the public (e.g., data stored in search engines, public Twitter® pictures, public Facebook® pictures, etc.). However, in other examples, the multimedia data items may be private (e.g., private Facebook® pictures, private YouTube® videos, etc.) and may not be viewed by the public. In such examples (i.e., when the multimedia data is private), the systems and methods described herein may not proceed without first obtaining permission from the authors of the multimedia data items to access the multimedia data items.

In the examples where the multimedia data items are private or include personally identifiable information (PII) that identifies or can be used to identify, contact, or locate a person to whom such data pertains, a user 106 may be provided with notice that the systems and methods herein are collecting PII. Additionally, prior to initiating PII data collection, users 106 may have an opportunity to opt-in or opt-out of the PII data collection. For example, a user may opt-in to the PII data collection by taking affirmative action indicating that he or she consents to the PII data collection. Alternatively, a user 106 may be presented with an option to opt-out of the PII data collection. An opt-out option may require an affirmative action to opt-out of the PII data collection, and in the absence of affirmative user action to opt-out, PII data collection may be impliedly permitted.

In some examples, the plurality of multimedia data items returned to the receiving module 202 may be noisy. Accordingly, the input module 116 may filter one or more multimedia data items from the plurality of multimedia data items to mitigate the noise in the multimedia data items used for training classifiers. In additional or alternative examples, the receiving module 202 may receive new multimedia data items for classifying by the trained classifiers.

The training module 118 may train classifiers based at least in part on positive multimedia data items and negative multimedia data items. In at least one example, each classifier may represent a multi-class classifier that may be associated with a particular topic and may include multiple classifiers for differentiating between the labels associated with the particular topic. The training module 118 may include additional components or modules for training the classifiers. In at least one example, the training module 118 may include a feature extraction module 204, a learning module 206, and an updating module 208, which includes a statistics module 210.

The feature extracting module 204 may extract features from the multimedia data items. Feature extraction may describe the process of identifying interesting portions or shapes of multimedia data items and extracting those features for additional processing. The process of identifying interesting portions or shapes of multimedia data items may occur via common multimedia feature extraction techniques such as SIFT (scale-invariant feature transform), deep neural networks (DNN) feature extractor, etc. In at least one example, multimedia feature extraction may describe turning a piece of multimedia data (image, video, audio, speech, music) into a high dimensional feature vector. For example, all information provided may be organized as a single vector, which is commonly referred to as a feature vector. In at least one example, each multimedia data item in the corpus of multimedia data items may have a corresponding feature vector based on a suitable set of multimedia features. Features may include visual features, textual features, motion features, spectrum features, etc. Visual features may range from simple visual features, such as edges and/or corners, to more complex visual features, such as objects. Textual features include tags, classes, and/or metadata associated with the multimedia data items. For video, motion features can be further generated to describe the movement of the object in the video. For audio, speech, and/or music, spectrum features can be generated.

The learning module 206 may apply one or more learning algorithms to the extracted features for training classifiers to recognize one or more labels associated with a topic. As described above, each classifier may represent a multi-class classifier that may be associated with a particular topic and may include multiple classifiers for differentiating between the labels associated with the particular topic. For example, learning algorithms such as fast rank, Stochastic Gradient Descent (SGD), Support Vector Machines (SVM), boosting, etc., may be applied to learn a multi-class classifier for identifying one or more labels associated with a topic. In some examples, the learning algorithm may include an online SVM. In at least one example, classifiers for all of the labels may be trained at the same time using multi-label learning techniques, such as multi-class SVM or SGD. In other examples, the training described above may be applied to new labels as new labels are received and the new classifiers may be added to a multi-class classifier. Each multi-class classifier may include a plurality of model vectors. Each model vector may correspond to one of the labels associated with the topic. As described above, a model vector may represent a position of a label in a high dimensional space. The model vector may be based at least in part on the feature vectors extracted from positive multimedia data items associated with the label.

The updating module 208 may update the classifiers (e.g., multi-class classifiers) based at least in part on applying the classifiers to new multimedia data items. In some examples, the new multimedia data items may be positive multimedia data items. In other examples, the new multimedia data items may be negative multimedia data items. The classifying module 120 may apply the classifier to the new multimedia data item and determined similarity values may be output to the statistics module 210 associated with the updating module 208. The updating module 208 may leverage the similarity values to determine whether to update the model vectors as described below. The updating module 208 may update the model vectors differently based at least in part on whether the new multimedia data items are positive multimedia data items or negative multimedia data items. In some examples, the updating module 208 may scale up a model vector. In other examples, the updating module 208 may scale down a model vector. The training module 118 may iteratively process the corpus of multimedia data items one or more additional times to update the model vectors and stabilize the classifiers over time. Following each iteration, the statistics module 210 may update the statistics, as described below.

The statistics module 210 may represent a repository (e.g., database, cache, digital storage mechanism, etc.) that may store determined statistics based at least in part on iterations of training the classifiers using the positive multimedia data items. That is, the statistics may be derived from training and testing a classifier using positive multimedia data items associated with a topic. The statistics module 210 may leverage the similarity values to compute average similarity values for each label associated with the topic based at least in part on an averaging similarity values that are output after the classifier correctly identifies the label associated with a positive multimedia data item. The statistics module 210 may leverage the similarity values to compute additional statistics such as standard deviations, distributions (e.g., histograms, etc.), etc., of the similarity values based at least in part on the similarity values that are output after the classifier correctly identifies the label associated with a positive multimedia data item. As described below, the statistics stored in the statistics module 210 may represent threshold values and updating individual model vectors may be based at least in part on similarity values being above the threshold values.

The classifying module 120 may store one or more classifier(s) 212 (e.g., multi-class classifiers) and may be associated with a ranking module 214. The classifying module 120 may receive features extracted from multimedia data items and may apply the one or more classifier(s) 212 to the features for classifying the multimedia data items. After applying the one or more classifier(s) 212 to the features extracted from the multimedia data items, the classifying module 120 may output similarity values for individual multimedia data items. Each similarity value may correspond to a label in the set of labels. As described above, a similarity value may represent a distance between a feature vector for an individual multimedia data item and a model vector for a particular label in a high dimensional space. In some examples, the similarity values may be similar to confidence values. For instance, a larger similarity value may indicate that the system is more confident that a multimedia data item is likely to be associated with a particular label associated with the large similarity value than a different label associated with a smaller similarity value. The ranking module 214 may rank the labels based at least in part on the similarity values. In some examples, highest ranking labels may represent labels that are most likely associated with the multimedia data item and lowest ranking labels may represent labels that are least likely associated with the multimedia data item. The classifying module 120 may output recognition results including one or more labels that may be associated with the multimedia data item. In some examples, the recognition results may include confidence scores.

Example Processes

Figure 3:
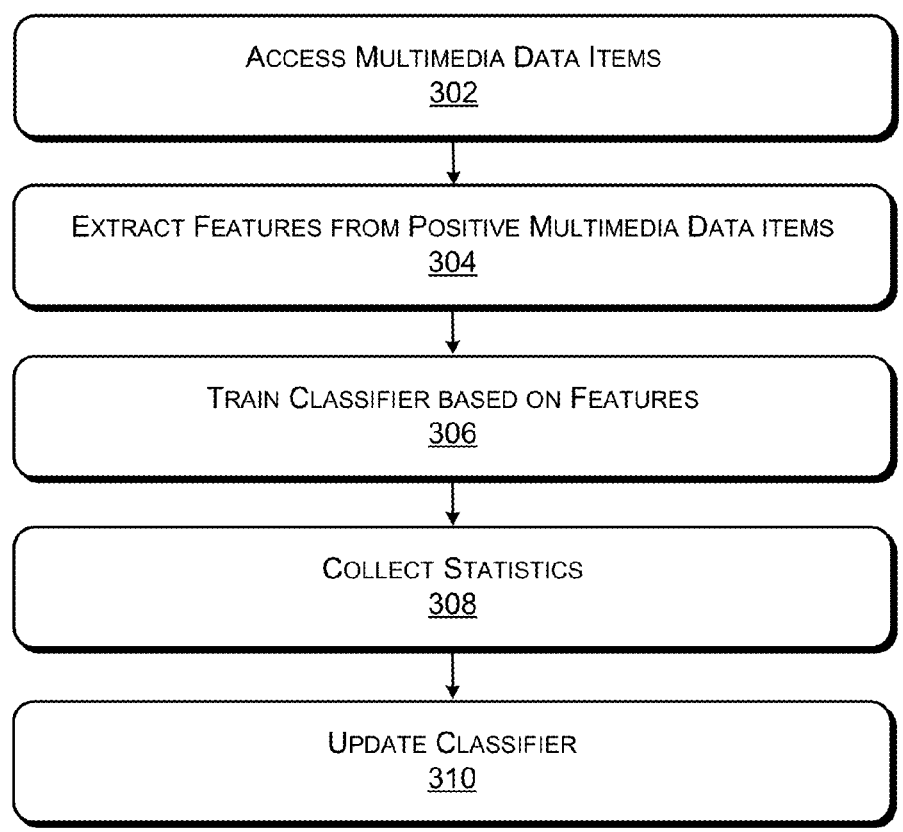
FIG. 3 illustrates an example process for training and updating classifiers.
Figure 4:
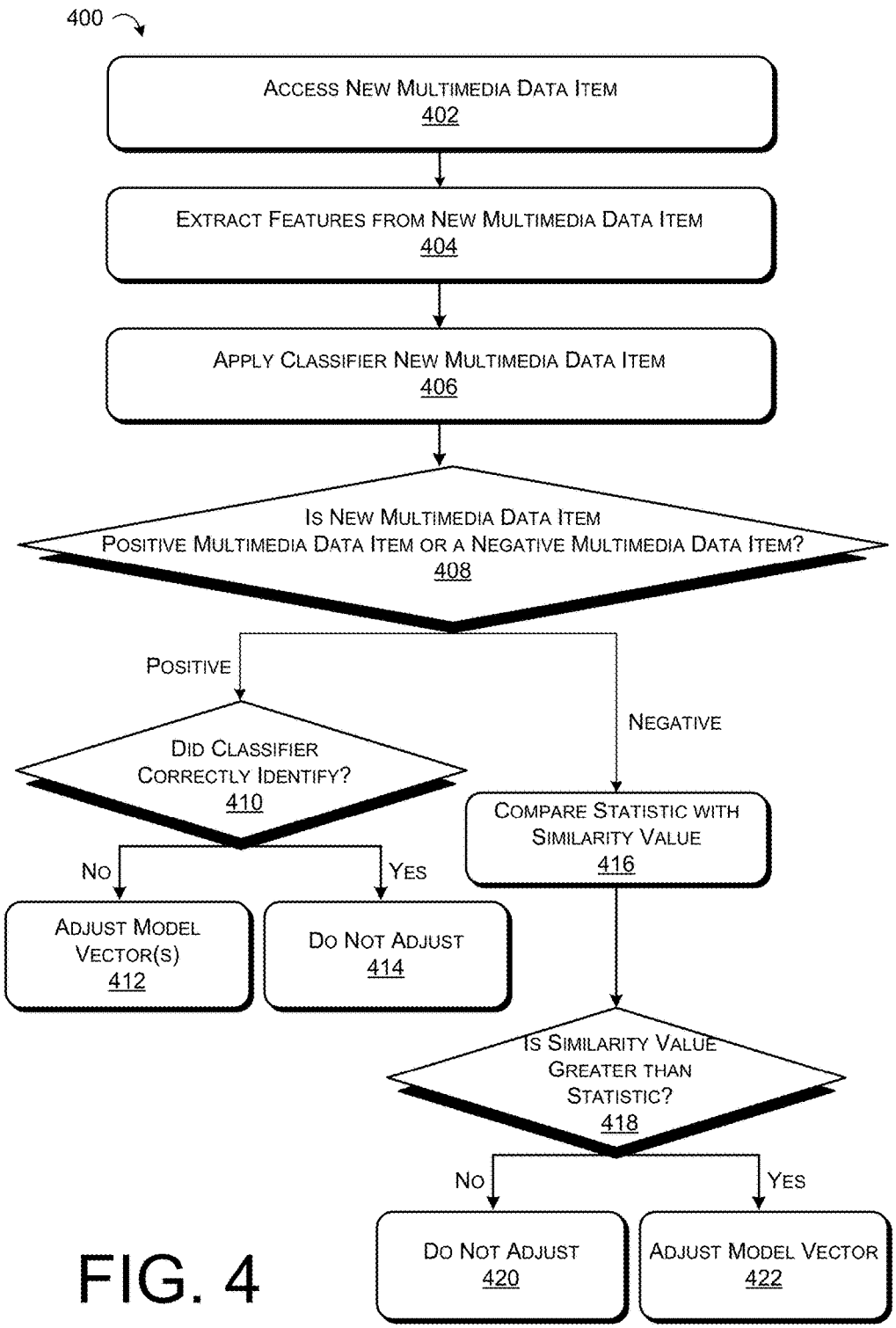
FIG. 4 illustrates an example process for updating classifiers, based at least in part on determining whether a new multimedia data item is a positive multimedia data item or a negative multimedia data item.

FIGS. 3 and 4 describe example processes for training one or more classifier(s) 212 from positive multimedia data items, determining whether to update the one or more classifier(s) 212 based at least in part on positive and/or negative multimedia data items, and, in at least some examples, updating the one or more classifier(s) 212. The example processes are described in the context of the environment of FIGS. 1 and 2 but are not limited to those environments. The processes are illustrated as logical flow graphs, each operation of which represents an operation in the illustrated or another sequence of operations that may be implemented in hardware, software, or a combination thereof. In the context of software, the operations represent computer-executable instructions stored on one or more computer-readable media 114 that, when executed by one or more processors 112, configure a computing device to perform the recited operations. Generally, computer-executable instructions include routines, programs, objects, components, data structures, and the like that configure a computing device to perform particular functions or implement particular abstract data types. The order in which the operations are described is not intended to be construed as a limitation, and any number of the described operations may be combined in any order and/or in parallel to implement the process.

FIG. 3 illustrates an example process 300 for training one or more classifier(s) 212 from positive multimedia data items and updating the one or more classifier(s) 212 based at least in part on positive and/or negative multimedia data items.

Block 302 illustrates accessing multimedia data items. In at least one example, the receiving module 202 may receive a corpus of multimedia data items. In some examples, the receiving module 202 may receive the corpus of multimedia data items based at least in part on sending queries to one or more search engines, social-networking services, blogging services, and/or other websites or web services, as described above. The training module 118 may access the corpus of multimedia data items. The corpus of multimedia data items may include positive multimedia data items and negative multimedia data items.

Block 304 illustrates extracting features from positive multimedia data items. As described above, the feature extracting module 204 may extract features that may represent contextual information associated with the positive multimedia data items. Each positive multimedia data item may be associated with a feature vector representative of a position of a positive multimedia data item in a high dimensional feature space.

Block 306 illustrates training a classifier based on the features. The learning module 206 may train one or more classifier(s) 212 for the plurality of labels based at least in part on the features. For example, learning algorithms such as fast rank, SGD, SVM, boosting, etc., may be applied to learn one or more classifier(s) 212 (e.g., multi-class classifiers), as described above. The one or more classifier(s) 212 may each include a plurality of model vectors, wherein each model vector corresponds to a label of a plurality of labels associated with a topic. As a nonlimiting example, if 300 labels are associated with a topic, a classifier may have 300 model vectors.

Training the one or more classifier(s) 212 may additionally include multiple iterations of applying the one or more classifier(s) 212 to positive multimedia data items to stabilize the model vectors. In at least one example, the training module 118 may receive a new positive multimedia data item associated with a first label of the plurality of labels associated with a topic. The new positive multimedia data item may be part of the corpus of multimedia data items and/or may be a multimedia data item received subsequent to the initial collection of the corpus. The first label may represent a true label or label that correctly identifies the new positive multimedia data item. The feature extraction module 204 may extract features from the new positive multimedia data item. The classifying module 120 may apply the one or more classifier(s) 212 to the extracted features to determine similarity values. As described above, the similarity values represent distances between the new positive multimedia data item and each of the labels in the plurality of labels in a high dimensional space. The classifying module 120 may leverage the similarity values to determine which label of the plurality of labels is associated with the new positive multimedia data item.

In at least one example, the classifying module 120 may output similarity values indicating that the new positive multimedia data item is associated with a second label of the plurality of labels that is different from the first label (e.g., true label). In such examples, the classifying module 120 may compare the second label resulting from classification with the first label associated with the new positive multimedia data item. Based at least in part on identifying the misclassification, the updating module 208 may adjust at least some of the model vectors. For instance, if the classifying module 120 determines that the new positive multimedia data item is incorrectly classified as the second label, the updating module 208 may scale down the model vector associated with the second label and may scale up the model vector associated with the first label. Adjusting the model vectors may refine the classifier so that a true label associated with a multimedia data item may have an increased probability of being recognized as the result during classification. EQUATION 1 below is a non-limiting example of an algorithm for adjusting model vectors based at least in part on determining that the one or more classifier(s) 212 incorrectly classified a new positive multimedia data item.

Equation 1

For an incoming sample $(x_i, y_i)$, wherein:
$x_i$ represents a high dimensional feature vector determined based on feature extraction by the feature extraction module 204;
$y_i$ represents a label of the plurality of labels ($[1, \ldots, C]$) associated with a topic;

$$y_i \in [1, \ldots, C]: l = \max_{j \notin y_i} w_j^T x_i;$$

$w_l$=model vector associated with the incorrect label (e.g., second label);
$w_{y_i}$=model vector associated with the correct label (e.g., first label);
$w_l^T x_i$=similarity value of $x_i$ and $w_l$ (e.g., the dot product); and
$w_{y_i}^T x_i$=similarity value of $x_i$ and $w_{y_i}$ (e.g., the dot product);

if $w_l^T x_i + 1 > w_{y_i}^T x_i$ and $\delta = \eta x_i$, update a model vector associated with $w_l$ and $w_{y_i}$ such that $$w_l = (1-\lambda)w_l - \delta$$

and $$w_{y_i} = (1-\lambda)w_{y_i} + \delta.$$

Block 308 illustrates collecting statistics. Based at least in part on applying the one or more classifier(s) 212 to one or more of the positive multimedia data items, the updating module 208 may collect statistics corresponding to each of the labels. As described above, the statistics module 210 may represent a repository that may store statistics based at least in part on iterations of training and testing the one or more classifier(s) 212. The statistics module 210 may leverage the similarity values to compute averages, standard deviations, kth order statistics, distributions (e.g., histograms, etc.), etc., of similarity values for each label based at least in part on similarity values resulting from using the one or more classifier(s) 212 to correctly determine the label associated with a positive multimedia data item. As described below, the statistics stored in the statistics module 210 may represent threshold values and updating individual model vectors may be based at least in part on similarity values being above the threshold values. In some examples, following each of the iterations of applying the one or more classifier(s) 212 to new positive multimedia data items to stabilize the model vectors, the statistics module 210 may update the statistics. In other examples, the statistics module 210 may update the statistics in predetermined time intervals.

Block 310 illustrates updating the one or more classifier(s) 212. The training module 118 may access new multimedia data items of the corpus of multimedia data items. The new multimedia data items may include positive multimedia data items and negative multimedia data items. The feature extraction module 204 may extract features from the new multimedia data items. The classifying module 120 may apply the one or more classifier(s) 212 to the extracted features to determine similarity values. As described above, the similarity values represent distances between the new multimedia data item and each of the labels in the plurality of labels in a high dimensional space. The classifying module 120 may output the similarity values to the updating module 208 to determine whether to update the one or more classifier(s) 212. The updating module 208 may perform different updates to the model vectors associated with the one or more classifier(s) 212 based at least in part on whether the new multimedia data items are positive multimedia data items or negative multimedia data items.

FIG. 4 illustrates an example process 400 for updating the one or more classifier(s) 212, based at least in part on determining whether the new multimedia data item is a positive multimedia data item or a negative multimedia data item.

Block 402 illustrates accessing a new multimedia data item. The training module 118 may access new multimedia data items from the corpus of multimedia data items. The new multimedia data items may include positive multimedia data items and negative multimedia data items, as described above.

Block 404 illustrates extracting features from the new multimedia data item. The feature extraction module 204 may extract features that may represent contextual information associated with the new multimedia data item. The new multimedia data item may be associated with a feature vector representative of a position of the new multimedia data item in a high dimensional feature space.

Block 406 illustrates applying the one or more classifier(s) 212 to the features to determine similarity values corresponding to each of the labels. Based at least in part on applying the one or more classifier(s) 212 to the features, the classifying module 120 may output a set of similarity values representative of distances between the model vectors associated with each label of the plurality of labels and the feature vector extracted from the new multimedia data item in a high dimensional space.

Block 408 illustrates determining whether the new multimedia data item is a positive multimedia data item or a negative multimedia data item. The updating module 208 may determine whether the new multimedia data item is a positive multimedia data item or a negative multimedia data item. In at least some examples, determining whether the new multimedia data item is a positive multimedia data item or a negative multimedia data item may be based on labels associated with the new multimedia data item. If the updating module 208 determines that the new multimedia data item is a positive multimedia data item, the updating module 208 updates the model pursuant to blocks 410, 412, and 414. On the other hand, if the updating module 208 determines that the new multimedia data item is a negative multimedia data item, the updating module 208 may update the model pursuant to blocks 416, 418, 420, and 422.

Block 410 illustrates determining whether the one or more classifier(s) 212 correctly identified the label associated with the new positive multimedia data item. In at least one example, the classifying module 120 may output similarity values indicating that the new positive multimedia data item is associated with a label of the plurality of labels that is different from the true label. In such examples, the classifying module 120 may compare the label resulting from classification with the true label associated with the new positive multimedia data item. Based at least in part on identifying the misclassification, the updating module 208 may adjust at least some of the model vectors, as illustrated in Block 412. For instance, if the classifying module 120 determines that the new positive multimedia data item is incorrectly classified, the updating module 208 may scale down the model vector associated with the incorrect label and may scale up the model vector associated with the true label. Adjusting the model vectors may refine the classifier so that a true label associated with a multimedia data item may have an increased probability of being recognized as the result during classification. EQUATION 1 above is a non-limiting example of an algorithm for adjusting model vectors based at least in part on determining that the one or more classifier(s) 212 incorrectly classified a new positive multimedia data item. If the one or more classifier(s) 212 correctly identifies the new positive multimedia data item with its true label, the updating module 208 may not adjust any of the model vectors, as Block 414 illustrates.

Block 416 illustrates comparing the statistics stored in the statistics module 210 with the similarity values output by the classifying module 120 that correspond to each of the labels. As a non-limiting example, if the one or more classifier(s) 212 are associated with the topic "dogs" and one of the labels associated with the topic of "dogs" is "Poodle," the updating module 208 may compare the statistic associated with "poodle" to the similarity value associated with "Poodle." Based at least in part on comparing the statistics stored in the statistics module 210 with the similarity values output from applying the one or more classifier(s) 212 to features extracted from a new multimedia data item, the updating module 208 may update individual model vectors of the plurality of model vectors.

Block 418 illustrates determining whether a similarity value is greater than a corresponding statistic associated with a same label. As shown by the arrow labeled "No," the updating module 208 may determine that a similarity value that corresponds to a particular label is less than a corresponding statistic associated with the particular label. Accordingly, the updating module 208 may not scale the model vector for the particular label as illustrated in Block 420. As shown by the arrow labeled "Yes," the updating module 208 may determine that a particular similarity value that corresponds to a particular label is greater than a corresponding statistic associated with the particular label. That is, the updating module 208 may determine that as a result of classifying the negative multimedia data item, the similarity value associated with the negative multimedia data item is likely to cause the negative multimedia data item to be misclassified as being associated with a label associated with the topic (e.g., the particular label). As a result, the updating module 208 may scale down the model vector that corresponds to the particular label, as illustrated in Block 422. In at least some examples, the statistics may represent threshold values and updating individual model vectors may be based at least in part on similarity values being above the threshold values. EQUATION 2 below is a non-limiting example of an algorithm for scaling down a particular model vector based at least in part on determining that a particular similarity value that corresponds to a particular label is greater than a corresponding statistic associated with the particular label.

Equation 2

For an incoming sample $(x_i, y_i)$, wherein:

$x_i$ represents a high dimensional feature vector based at least in part on features extracted from the feature extraction module 204;

$y_i = -1$ and $-1$ represents a label not associated with the topic;

$[\mu_1, \ldots, \mu_C]$ = statistics for the plurality of labels ($[1, \ldots, C]$);

$w_j$ = model vector associated with a particular label ($j=1, \ldots, C$); and $w_j^T x_i$ = similarity value of $x_i$ and $w_j$ (e.g., the dot product);

if $w_j^T x_i + 1 > \mu_j$ and $\delta = \eta_{neg} x_i$, adjust $w_j$ such that $w_j = w_j - \delta$.

Applying the One or More Classifiers

Figure 5:
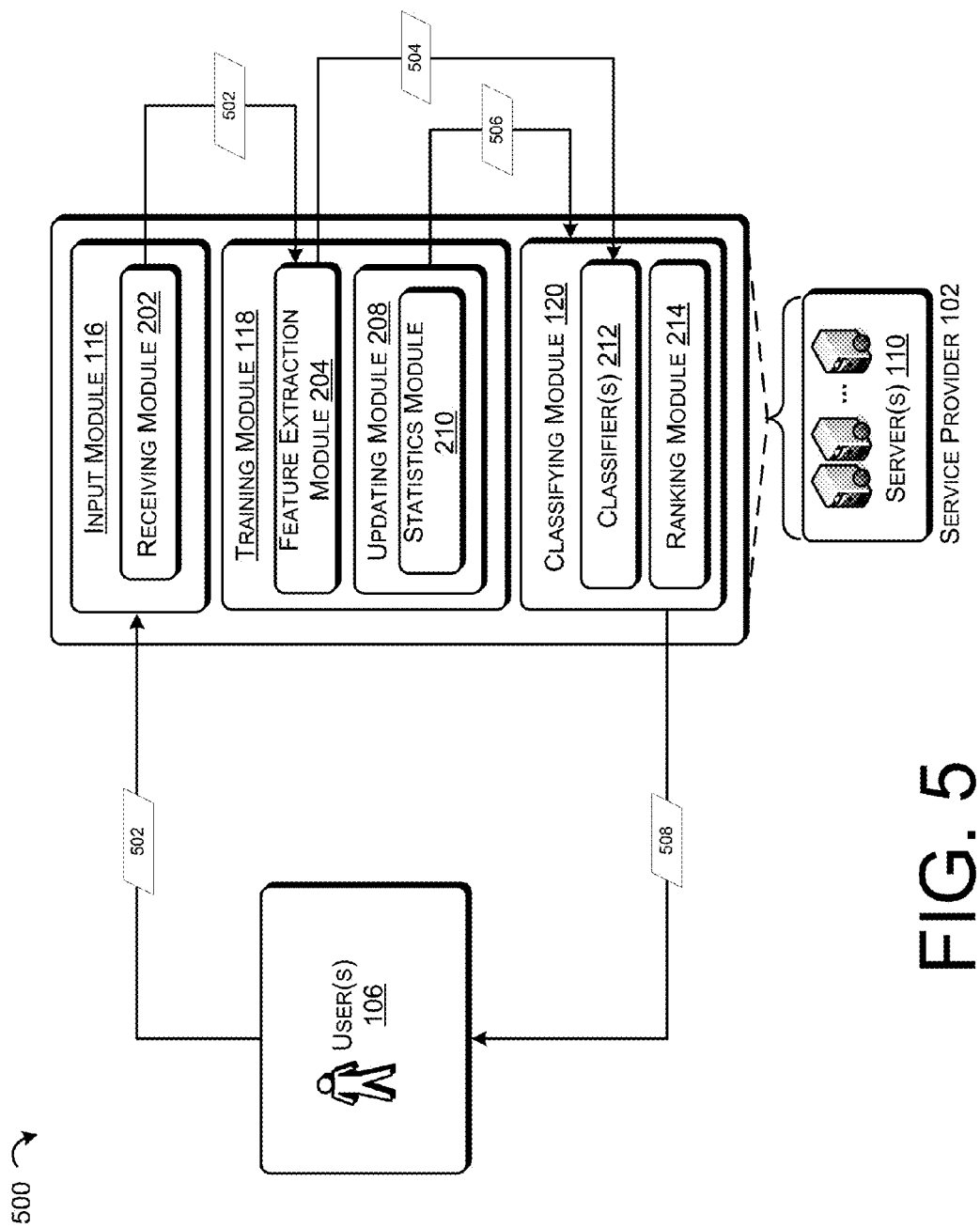
FIG. 5 illustrates a diagram showing an example system for classifying a new multimedia data item.

FIG. 5 illustrates a diagram showing an example system 500 for classifying a new multimedia data item. As shown in FIG. 5, the system 500 may include the input module 116, training module 118, and classifying module 120.

The input module 116 may include the receiving module 202. The receiving module 202 may receive a new multimedia data item 502 for classifying. The new multimedia data item 502 may be a positive multimedia data item or a negative multimedia data item. User(s) 106 may input one or more multimedia data items into the receiving module 202 via one of the user devices 108. For example, in at least one example, a user 106 may select a multimedia data item stored on his or her user device 108 for input into the input module 116. In another example, a user 106 may take a photo or video via his or her user device 108 and input the multimedia data item into the input module 116. Additionally or alternatively, a user 106 may otherwise identify a multimedia data item for classification. In at least some examples, the user(s) 106 may include a topic associated with the new multimedia data item 502. For example, if a user 106 inputs an image of a Poodle, the user 106 may indicate that the image is associated with the topic, "dog."

The receiving module 202 may send the new multimedia data item 502 to the feature extraction module 204 associated with the training module 118. The feature extraction module 204 may extract features from the new multimedia data item 502. As described above, feature extraction may describe turning a piece of multimedia data (image, video, audio, speech, music) into a high dimensional feature vector. In at least one example, the new multimedia data item 502 may be associated with a feature vector based on the extracted features. The feature extraction module 204 may send the features 504 to the classifying module for classifying by the one or more classifier(s) 212. Additionally, in at least one example, the updating module 208 may send the statistics 506 stored in the statistics module 210 to the classifying module 120. In other examples, the updating module 208 may receive similarity values from the classifying module 120 for comparing similarity values to the statistics 506, as described below.

The classifying module 120 may apply the one or more classifier(s) 212 to the features 504 for classification. Based at least in part on applying the one or more classifier(s) 212 to the features 504, the classifying module 120 may output similarity values. As described above, the similarity values may represent distances between the feature vector associated with the new multimedia data item 502 and the weight vectors associated with each of the labels associated with the topic in a high dimensional space. In at least one example, the classifying module 120 may compare each of the similarity values to corresponding statistics 506. In some examples, as described above, the classifying module 120 may send the similarity values to the updating module 208 for comparing. The classifying module 120 may compare each of the similarity values to the statistics 506 to determine whether the new multimedia data item 502 is associated with any of the labels associated with the topic.

In at least one example, the classifying module 120 may leverage the statistics 506 as threshold values to determine whether the new multimedia data item 502 is associated with any of the labels. For instance, if the classifying module 120 determines that all of the similarity values are below all of the statistics 506, the classifying module 120 may determine that the new multimedia data item 502 is not associated with any of the labels associated with the topic. That is, the classifying module 120 may reject the new multimedia data item 502 and may not determine a label of the plurality of labels is associated with the new multimedia data item 502.

If the classifying module 120 determines that at least some of the similarity values corresponding to one or more of the labels are above the statistics 506 (e.g., a predetermined threshold), then the classifying module 120 may determine that the new multimedia data item 502 is associated with at least some of the labels. In at least one example, the statistics 506 may be leveraged as adaptive threshold values. For instance, the classifying module 120 may compare the similarity values associated with the new multimedia data item 502 on a label-by-label basis. That is, the classifying module 120 may determine whether a first label may be associated with the new multimedia data item 502 by comparing a similarity value that is associated with the first label with a statistic associated with the first label. If the similarity value associated with the first label is greater than the statistic associated with the first label, the first label may be associated with the new multimedia data item 502. The classifying module 120 may determine whether a second label may be associated with the new multimedia data item 502 by comparing a similarity value that is associated with the second label with a statistic associated with the second label. If the similarity value associated with the second label is greater than the statistic associated with the second label, the second label may be associated with the new multimedia data item 502. The statistic associated with the first label may be different from the statistic associated with the second label.

If the classifying module 120 determines that the new multimedia data item 502 is associated with at least one label of the plurality of labels associated with a topic, the classifying module 120 may determine which label of the plurality of labels is associated with the new multimedia data item 502. The ranking module 214 may rank labels based at least in part on the similarity values that correspond to each of the labels. The highest ranking similarity value may correspond to the label that is closest in distance to the new multimedia data item 502 (e.g., most similar to the new multimedia data item 502). The lowest ranking similarity value may correspond to the label that is farthest away from the new multimedia data item 502 (e.g., the most dissimilar to the new multimedia data item 502). In some examples, the ranking module 214 may rank all of the similarity values that are above the corresponding statistic. In other examples, the ranking module 214 may rank a predetermined number of similarity values (e.g., 10, 5, 2, etc.) and/or may rank similarity values above a predetermined threshold.

In at least one example, the classifying module 120 may select a label corresponding to the highest ranking similarity value as the label associated with the new multimedia data item 502. In some examples, the classifying module 120 may select a predetermined number (e.g., 5, 3, 2) of the labels corresponding to similarity values above a predetermined threshold and may return the predetermined number of the labels with confidence scores as a recognition result 508. In other examples, the classifying module 120 may select a predetermined number (e.g., 100, 50, 20, etc.) of the labels corresponding to similarity values above a predetermined threshold and may compare the similarity values to the corresponding statistics 506. Based at least in part on comparing the similarity values with the corresponding statistics, the ranking module 214 may re-rank the labels in the predetermined number of labels. Based at least in part on the re-ranking, the classifying module 120 may determine that a particular label associated with a highest ranking similarity value of the re-ranked similarity values is associated with new multimedia data item 502.

The classifying module 120 may send a recognition result 508 to the user(s) 106. If the new multimedia data 502 item is a positive multimedia data item, the recognition result 508 may include at least one label associated with the new multimedia data item 502, and in some examples, a confidence score associated with the at least one label. If the new multimedia data item 502 is a negative multimedia data item, the recognition result 508 may include a rejection indicating that the new multimedia data 502 item is not associated with any of the labels in the topic.

Example Processes

The example processes 600, 700, and 800 are described in the context of the environment of FIGS. 1, 2, and 5 but are not limited to those environments. The processes 600, 700, and 800 are illustrated as logical flow graphs, each operation of which represents an operation in the illustrated or another sequence of operations that may be implemented in hardware, software, or a combination thereof. In the context of software, the operations represent computer-executable instructions stored on one or more computer-readable media 114 that, when executed by one or more processors 112, configure a computing device to perform the recited operations. Generally, computer-executable instructions include routines, programs, objects, components, data structures, and the like that configure a computing device to perform particular functions or implement particular abstract data types. The order in which the operations are described is not intended to be construed as a limitation, and any number of the described operations may be combined in any order and/or in parallel to implement the process.

Figure 6:
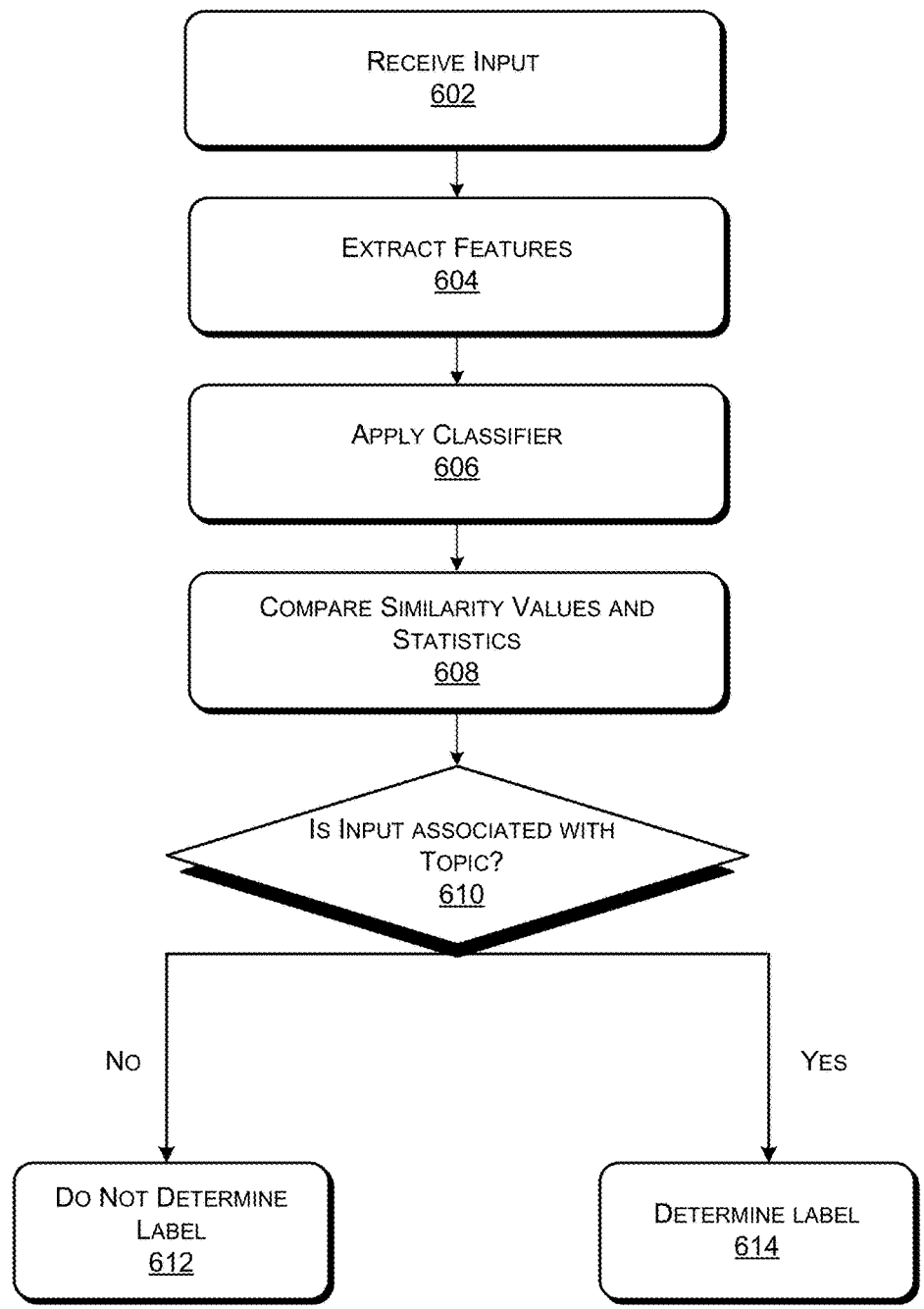
FIG. 6 illustrates an example process for classifying a new multimedia data item.

FIG. 6 illustrates an example process 600 for determining whether to classify a new multimedia data item 502.

Block 602 illustrates receiving input (e.g., a new multimedia data item 502). The receiving module 202 may receive a new multimedia data item 502 for classifying. The new multimedia data item 502 may be a positive multimedia data item or a negative multimedia data item. In at least some examples, the user(s) 106 may also input a topic associated with the new multimedia data item 502.

Block 604 illustrates extracting features. The feature extraction module 204 may extract features 504 from the new multimedia data item 502. As described above, the new multimedia data item 502 may be associated with a feature vector based on the extracted features.

Block 606 illustrates applying the one or more classifier(s) 212. The classifying module 120 may apply the one or more classifier(s) 212 to the features 504 for classification. Based at least in part on applying the one or more classifier(s) 212 to the features 504, the classifying module 120 may output similarity values. As described above, the similarity values may represent distances between the feature vector associated with the new multimedia data item 502 and the weight vectors associated with each of the labels in a set of labels associated with the topic.

Block 608 illustrates comparing similarity values and statistics 506. In at least one example, the classifying module 120 may compare each of the similarity values to corresponding statistics 506. For instance, the classifying module 120 may compare a similarity value associated with a particular label with statistics 506 associated with the particular label. The classifying module 120 may perform such a comparison for each of the labels in the plurality of labels associated with the topic. As described above, in some examples, as described above, the classifying module 120 may send the set of similarity values to the updating module 208 for comparing.

Block 610 illustrates determining whether an input is associated with the topic. As described above, in at least one example, the classifying module 120 may leverage the statistics 506 as threshold values to classify the new multimedia data item 502. In at least one example, classifying the new multimedia data item 502 includes determining whether the new multimedia data item 502 is associated with any of the labels associated with the topic. For instance, if the classifying module 120 determines that all of the similarity values are below all of the statistics 506, the classifying module 120 may determine that the new multimedia data item 502 is not associated with any of the labels associated with the topic. That is, the classifying module 120 may reject the new multimedia data item 502 and may not determine a label for the new multimedia data item 502, as illustrated in Block 612.

If the classifying module 120 determines that at least some of the similarity values corresponding to one or more of the labels are above the corresponding statistics 506 (e.g., a predetermined threshold), then the classifying module 120 may determine that the new multimedia data item 502 is associated with at least some of the labels. Accordingly, the classifying module 120 may proceed with further classifying the new multimedia data item 502 to determine which label is associated with the new multimedia data item 502, as illustrated in Block 614 and discussed in FIGS. 7 and 8, below.

Figure 7:
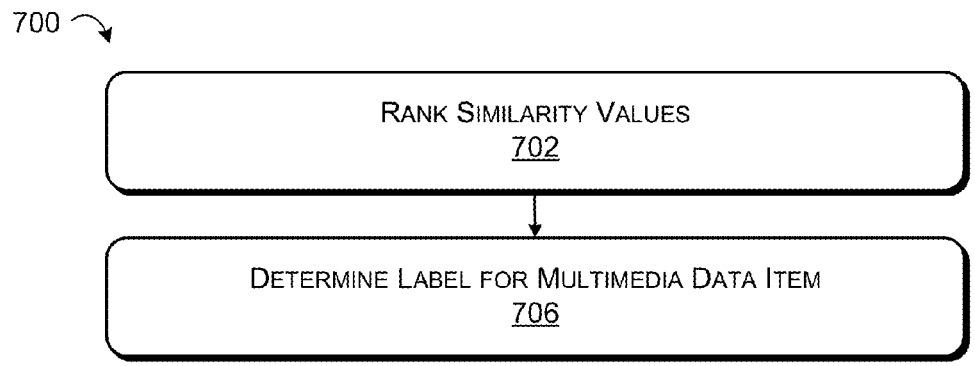
FIG. 7 illustrates an example process for determining a label associated with a new multimedia data item.

FIG. 7 illustrates an example process 700 for determining a label associated with a new multimedia data item 502.

Block 702 illustrates ranking the similarity values. Based at least in part on the classifying module 120 determining that the new multimedia data item 502 may be associated with at least one label of the plurality of labels associated with a topic, the ranking module 214 may rank the similarity values that correspond to each of the labels. In some examples, the ranking module 214 may rank all of the similarity values that are above a corresponding statistic 506. In other examples, the ranking module 214 may rank a predetermined number of similarity values (e.g., 10, 5, 2, etc.) that are above the corresponding statistics 506.

Block 704 illustrates determining a label for the new multimedia data item 502. In at least one example, the classifying module 120 may select a label corresponding to the highest ranking similarity value as the label associated with the new multimedia data item 502. In some examples, the classifying module 120 may select a predetermined number (e.g., 5, 3, 2) of the labels corresponding to similarity values above a predetermined threshold and may return the predetermined number of the labels with confidence scores as a recognition result 508. The recognition result 508 may inform a user 106 of the predetermined number of possible results for labels and may include confidence scores associated with each possible result. In some examples, confidence scores may be based at least in part on the statistics.

Figure 8:
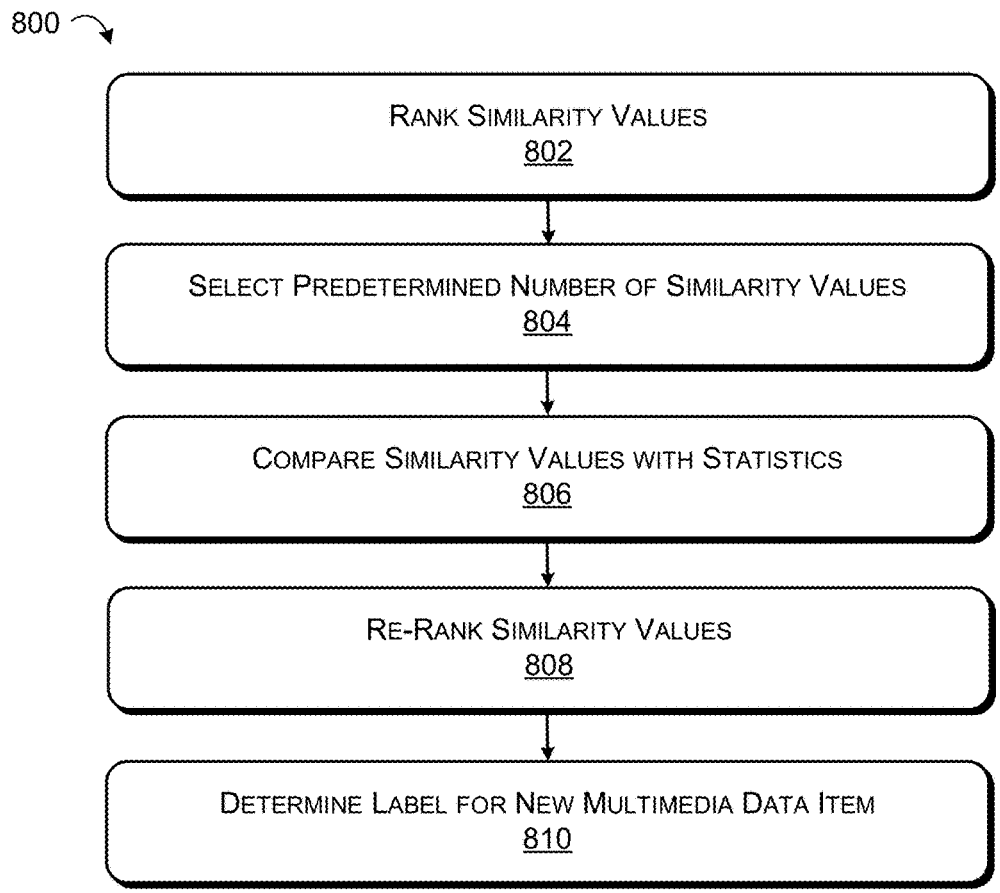
FIG. 8 illustrates an example process for determining a label associated with a new multimedia data item.

FIG. 8 illustrates an example process 800 for determining a label associated with a new multimedia data item 502.

Block 802 illustrates ranking the similarity values, as described above.

Block 804 illustrates selecting a predetermined number of similarity values. The classifying module 120 may select a predetermined number (e.g., 100, 50, 20, etc.) of the similarity values above a predetermined threshold for further processing.

Block 806 illustrates comparing similarity values with statistics 506. The classifying module 120 may compare the similarity values associated with the corresponding statistics 506.

Block 808 illustrates re-ranking similarity values. Based at least in part on comparing the similarity values with the corresponding statistics 506, the ranking module 214 may re-rank the similarity values.

Block 810 illustrates determining a label for the new multimedia data item 502. Based at least in part on the re-ranking, the classifying module 120 may determine at least one label that may be associated with the new multimedia data item 502. In some examples, the classifying module 120 may determine that a particular label associated with a highest ranking similarity value of the re-ranked similarity values is associated with new multimedia data item 502. In other examples, the classifying module 120 may select a predetermined number (e.g., 5, 3, 2) of the re-ranked labels and may return the predetermined number of the labels with confidence scores as a recognition result 508. The recognition result 508 may inform a user 106 of the predetermined number of possible results for labels and may include confidence scores associated with each possible result.

A. A system comprising: computer-readable media; one or more processors; and one or more modules stored in the computer-readable media and executable by the one or more processors to perform operations comprising: accessing a multimedia data item; extracting features from the multimedia data item; applying a classifier to the features to determine similarity values corresponding to individual labels of a plurality of labels, the classifier including a plurality of model vectors each corresponding to one of the individual labels; determining whether the multimedia data item is a positive multimedia data item or a negative multimedia data item; and updating at least one model vector of the plurality of model vectors, wherein updating the at least one model vector comprises applying a first update for the positive multimedia data item and a second update for the negative multimedia data item.

B. A system as paragraph A recites, the operations further comprising training the classifier based at least in part on a plurality of positive multimedia data items, the training comprising: accessing individual positive multimedia data items of the plurality of multimedia data items, each of the individual positive multimedia data items being associated with one of the individual labels; extracting features from the individual positive multimedia data items; and training the classifier based at least in part on the features extracted from the individual positive multimedia data items.

C. A system as paragraph A or B recites, wherein the updating the at least one model vector via the second update comprises: determining that a particular similarity value of the similarity values is greater than a statistic derived from training the classifier based at least in part on a plurality of positive multimedia data items, the particular similarity value and the statistic being associated with a particular individual label of the plurality of labels; and adjusting the at least one model vector, the at least one model vector corresponding to the particular individual label.

D. A system as paragraph C recites, wherein the statistic comprises an average similarity value determined based at least in part on applying the classifier to individual positive multimedia data items of the plurality of positive multimedia data items, the individual positive multimedia data items associated with the particular individual label; a standard deviation of similarity values determined based at least in part on applying the classifier to the individual positive multimedia data items associated with the particular individual label; or a distribution of similarity values determined based at least in part on applying the classifier to the individual positive multimedia data items associated with the particular individual label.

E. A system as paragraph C recites, wherein adjusting the at least one model vector comprises scaling down the at least one model vector.

F. A computer-implemented method comprising: accessing a corpus of multimedia data items, the corpus of multimedia data items including positive multimedia data items and negative multimedia data items, wherein: individual positive multimedia data items of the positive multimedia data items are associated with individual labels of a plurality of labels; and the negative multimedia data items are not associated with any label of the plurality of labels; extracting a first set of features from the individual positive multimedia data items; training a classifier based at least in part on the first set of features, the classifier including a plurality of model vectors each corresponding to one of the individual labels; based at least in part on applying the classifier to one or more of the individual positive multimedia data items, collecting statistics corresponding to each of the individual labels; extracting a second set of features from a new multimedia data item; applying the classifier to the second set of features to determine similarity values corresponding to each of the individual labels; determining that the new multimedia data item is one of the negative multimedia data items; comparing the statistics with the similarity values corresponding to each of the individual labels; and based at least in part on comparing the statistics with the similarity values, updating individual model vectors of the plurality of model vectors.

G. A method as paragraph F recites, further comprising: receiving a second new multimedia data item associated with a first label of the plurality of labels; extracting a third set of features from the second new multimedia data item; applying the classifier to the third set of features; based at least in part on applying the classifier to the third set of features, determining new similarity values corresponding to each of the individual labels; determining that the second new multimedia data item is one of the positive multimedia data items; determining that the classifier classified the second new multimedia data item as being associated with a second label of the plurality of labels, the second label being different from the first label; and adjusting at least two of the individual model vectors.

H. A method as paragraph G recites, wherein adjusting at least two of the individual model vectors comprises: scaling down a first individual model vector of the individual model vectors, the first individual model vector associated with the second label; and scaling up a second individual model vector of the individual model vectors, the second individual model vector associated with the first label.

I. A method as paragraph G recites, further comprising updating the statistics based at least in part on determining the new similarity values.

J. A method as any of paragraphs F-I recite, wherein updating the individual model vectors comprises: determining that a particular similarity value of the similarity values that corresponds to a particular individual label of the individual labels is greater than a particular statistic of the statistics associated with the particular individual label; and scaling down a particular individual model vector of the individual model vectors, the particular individual model vector corresponding to the particular individual label.

K. A method as any of paragraphs F-J recite, wherein the statistics comprise one or more of: averages of the similarity values generated when the classifier correctly identifies an individual positive multimedia data item of the individual positive multimedia data items with an individual label of the individual labels; standard deviations of the similarity values generated when the classifier correctly identifies the individual positive multimedia data item with the individual label; kth order statistics of the similarity values generated when the classifier correctly identifies the individual positive multimedia data item with the individual label; or distributions representative of the similarity values generated when the classifier correctly identifies the individual positive multimedia data item with the individual label.

L. A method as any of paragraphs F-K recite, wherein: the statistics comprise threshold values; and updating the individual model vectors is based at least in part on the similarity values being above the threshold values.

M. A method as any of paragraphs F-L recite, wherein the classifier is a multi-class support vector machine.

N. One or more computer-readable media encoded with instructions that, when executed by a processor, configure a computer to perform a method as any of paragraphs F-M recite.

O. A device comprising one or more processors and one or more computer readable media encoded with instructions that, when executed by the one or more processors, configure a computer to perform a computer-implemented method as any of paragraphs F-M recite.

P. One or more computer-readable media encoded with instructions that, when executed by a processor, configure a computer to perform acts comprising: training a classifier based at least in part on a plurality of multimedia data items, wherein the plurality of multimedia data items include positive multimedia data items and negative multimedia data items; applying the classifier to the positive multimedia data items; based at least in part on applying the classifier to the positive multimedia data items, collecting statistics associated with individual labels of a plurality of labels; receiving a new multimedia data item; extracting features from the new multimedia data item; applying the classifier to the features to generate similarity values corresponding to each of the individual labels; comparing the similarity values with the statistics; and classifying the new multimedia data item.

Q. One or more computer-readable media as paragraph P recites, wherein classifying the new multimedia data item comprises: determining that one or more of the similarity values corresponding to the individual labels are above predetermined thresholds for the individual labels; and determining that the new multimedia data item is associated with at least one of the individual labels.

R. One or more computer-readable media as paragraph Q recites, wherein the predetermined thresholds for the individual labels are adaptive thresholds based at least in part on the statistics associated with the individual labels.

S. One or more computer-readable media as any of paragraphs P-R recite, wherein classifying the new multimedia data item comprises: determining that the similarity values corresponding to all of the individual labels are below predetermined thresholds for the individual labels; and determining that the new multimedia data item is not associated with any of the individual labels.

T. One or more computer-readable media as any of paragraphs P-S recite, wherein: classifying the new multimedia data item comprises determining that the new multimedia data item is associated with at least one of the individual labels; and the acts further comprise ranking the similarity values.

U. One or more computer-readable media as paragraph T recites, wherein the acts further comprise, based at least in part on ranking the similarity values, determining that the new multimedia data item is associated with a particular individual label of the individual labels, the particular individual label being associated with a highest ranking similarity value.

V. One or more computer-readable media paragraph T recites, wherein the acts further comprise: selecting a predetermined number of the similarity values that are above a predetermined threshold; comparing the similarity values with corresponding of the statistics associated with the predetermined number of the individual labels; based at least in part on comparing the similarity values with the corresponding of the statistics associated with the predetermined number of the individual labels, re-ranking the predetermined number of the similarity values; and based at least in part on the re-ranking, determining that a particular individual label is associated with the new multimedia data item.

W. A device comprising one or more processors and one or more computer readable media as recited in any of paragraphs P-V.

X. A system comprising: computer-readable media; one or more processors; and one or more modules on the computer-readable media and executable by the one or more processors, the one or more modules to perform operations comprising: training a classifier based at least in part on a plurality of multimedia data items, wherein the plurality of multimedia data items include positive multimedia data items and negative multimedia data items; applying the classifier to the positive multimedia data items; based at least in part on applying the classifier to the positive multimedia data items, collecting statistics associated with individual labels of a plurality of labels; receiving a new multimedia data item; extracting features from the new multimedia data item; applying the classifier to the features to generate similarity values corresponding to each of the individual labels; comparing the similarity values with the statistics; and classifying the new multimedia data item.

Y. A system as paragraph X recites, wherein classifying the new multimedia data item comprises: determining that one or more of the similarity values corresponding to the individual labels are above predetermined thresholds for the individual labels; and determining that the new multimedia data item is associated with at least one of the individual labels.

Z. A system as paragraph Y recites, wherein the predetermined thresholds for the individual labels are adaptive thresholds based at least in part on the statistics associated with the individual labels.

AA. A system as any of paragraphs X-Z recite, wherein classifying the new multimedia data item comprises: determining that the similarity values corresponding to all of the individual labels are below predetermined thresholds for the individual labels; and determining that the new multimedia data item is not associated with any of the individual labels.

AB. A system as any of paragraphs X-AA recite, wherein: classifying the new multimedia data item comprises determining that the new multimedia data item is associated with at least one of the individual labels; and the acts further comprise ranking the similarity values.

AC. A system as paragraph AB recites, wherein the operations further comprise, based at least in part on ranking the similarity values, determining that the new multimedia data item is associated with a particular individual label of the individual labels, the particular individual label being associated with a highest ranking similarity value.

AD. A system as paragraph AB recites, wherein the operations further comprise: selecting a predetermined number of the similarity values that are above a predetermined threshold; comparing the similarity values with corresponding of the statistics associated with the predetermined number of the individual labels; based at least in part on comparing the similarity values with the corresponding of the statistics associated with the predetermined number of the individual labels, re-ranking the predetermined number of the similarity values; and based at least in part on the re-ranking, determining that a particular individual label is associated with the new multimedia data item.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "may," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

What is claimed is:

1. A computer-implemented method comprising:
   accessing a corpus of multimedia data items, the corpus of multimedia data items including positive multimedia data items and negative multimedia data items, wherein:
      individual positive multimedia data items of the positive multimedia data items are associated with individual labels of a plurality of labels; and
      the negative multimedia data items are not associated with any label of the plurality of labels;
   extracting a first set of features from the individual positive multimedia data items;
   training a classifier based at least in part on the first set of features, the classifier including a plurality of model vectors each corresponding to one of the individual labels;
   based at least in part on applying the classifier to one or more of the individual positive multimedia data items, collecting statistics corresponding to each of the individual labels;
   extracting a second set of features from a new multimedia data item;
   applying the classifier to the second set of features to determine similarity values corresponding to each of the individual labels;
   determining that the new multimedia data item is one of the negative multimedia data items;
   based at least in part on determining that the new multimedia data item is one of the negative multimedia data items, comparing the statistics with the similarity values corresponding to each of the individual labels; and
   based at least in part on comparing the statistics with the similarity values, updating individual model vectors of the plurality of model vectors.

2. A method as claim 1 recites, further comprising:
   receiving a second new multimedia data item associated with a first label of the plurality of labels;
   extracting a third set of features from the second new multimedia data item;
   applying the classifier to the third set of features;
   based at least in part on applying the classifier to the third set of features, determining new similarity values corresponding to each of the individual labels;
   determining that the second new multimedia data item is one of the positive multimedia data items;
   determining that the classifier classified the second new multimedia data item as being associated with a second label of the plurality of labels, the second label being different from the first label; and
   adjusting at least two of the individual model vectors.

3. A method as claim 2 recites, wherein adjusting at least two of the individual model vectors comprises:
   scaling down a first individual model vector of the individual model vectors, the first individual model vector associated with the second label; and
   scaling up a second individual model vector of the individual model vectors, the second individual model vector associated with the first label.

4. A method as claim 2 recites, further comprising updating the statistics based at least in part on determining the new similarity values.

5. A method as claim 1 recites, wherein updating the individual model vectors comprises:
   determining that a particular similarity value of the similarity values that corresponds to a particular individual label of the individual labels is greater than a particular statistic of the statistics associated with the particular individual label; and
   scaling down a particular individual model vector of the individual model vectors, the particular individual model vector corresponding to the particular individual label.

6. A method as claim 1 recites, wherein the statistics comprise one or more of:
   averages of the similarity values generated when the classifier correctly identifies an individual positive multimedia data item of the individual positive multimedia data items with an individual label of the individual labels;
   standard deviations of the similarity values generated when the classifier correctly identifies the individual positive multimedia data item with the individual label;

kth order statistics of the similarity values generated when the classifier correctly identifies the individual positive multimedia data item with the individual label; or distributions representative of the similarity values generated when the classifier correctly identifies the individual positive multimedia data item with the individual label.

7. A method as claim 1 recites, wherein:
the statistics comprise threshold values; and
updating the individual model vectors is based at least in part on the similarity values being above the threshold values.

8. A method as claim 1 recites, wherein the classifier is a multi-class support vector machine.

9. A system comprising:
one or more processors; and
instructions stored in computer storage media executable by the one or more processors to perform operations comprising:
   accessing a corpus of multimedia data items, the corpus of multimedia data items including positive multimedia data items and negative multimedia data items, wherein:
      individual positive multimedia data items of the positive multimedia data items are associated with individual labels of a plurality of labels; and
      the negative multimedia data items are not associated with any label of the plurality of labels;
   extracting a first set of features from the individual positive multimedia data items;
   training a classifier based at least in part on the first set of features, the classifier including a plurality of model vectors each corresponding to one of the individual labels;
   based at least in part on applying the classifier to one or more of the individual positive multimedia data items, collecting statistics corresponding to each of the individual labels;
   extracting a second set of features from a new multimedia data item;
   applying the classifier to the second set of features to determine similarity values corresponding to each of the individual labels;
   determining that the new multimedia data item is one of the negative multimedia data items;
   based at least in part on determining that the new multimedia data item is one of the negative multimedia data items, comparing the statistics with the similarity values corresponding to each of the individual labels; and
   based at least in part on comparing the statistics with the similarity values, updating individual model vectors of the plurality of model vectors.

10. A system as claim 9 recites, the operations further comprising:
receiving a second new multimedia data item associated with a first label of the plurality of labels;
extracting a third set of features from the second new multimedia data item;
applying the classifier to the third set of features;
based at least in part on applying the classifier to the third set of features, determining new similarity values corresponding to each of the individual labels;
determining that the second new multimedia data item is one of the positive multimedia data items;
determining that the classifier classified the second new multimedia data item as being associated with a second label of the plurality of labels, the second label being different from the first label; and
adjusting at least two of the individual model vectors.

11. A system as claim 10 recites, wherein adjusting at least two of the individual model vectors comprises:
scaling down a first individual model vector of the individual model vectors, the first individual model vector associated with the second label; and
scaling up a second individual model vector of the individual model vectors, the second individual model vector associated with the first label.

12. A system as claim 10 recites, the operations further comprising updating the statistics based at least in part on determining the new similarity values.

13. A system as claim 9 recites, wherein updating the individual model vectors comprises:
determining that a particular similarity value of the similarity values that corresponds to a particular individual label of the individual labels is greater than a particular statistic of the statistics associated with the particular individual label; and
scaling down a particular individual model vector of the individual model vectors, the particular individual model vector corresponding to the particular individual label.

14. A system as claim 9 recites, wherein the statistics comprise one or more of:
averages of the similarity values generated when the classifier correctly identifies an individual positive multimedia data item of the individual positive multimedia data items with an individual label of the individual labels;
standard deviations of the similarity values generated when the classifier correctly identifies the individual positive multimedia data item with the individual label;
kth order statistics of the similarity values generated when the classifier correctly identifies the individual positive multimedia data item with the individual label; or
distributions representative of the similarity values generated when the classifier correctly identifies the individual positive multimedia data item with the individual label.

15. A system as claim 9 recites, wherein:
the statistics comprise threshold values; and
updating the individual model vectors is based at least in part on the similarity values being above the threshold values.

16. One or more computer storage media encoded with instructions that, when executed by a processor, configure a computer to perform acts comprising:
accessing a corpus of multimedia data items, the corpus of multimedia data items including positive multimedia data items and negative multimedia data items, wherein:
   individual positive multimedia data items of the positive multimedia data items are associated with individual labels of a plurality of labels; and
   the negative multimedia data items are not associated with any label of the plurality of labels;
extracting a first set of features from the individual positive multimedia data items;
training a classifier based at least in part on the first set of features, the classifier including a plurality of model vectors each corresponding to one of the individual labels;

based at least in part on applying the classifier to one or more of the individual positive multimedia data items, collecting statistics corresponding to each of the individual labels;

extracting a second set of features from a new multimedia data item;

applying the classifier to the second set of features to determine similarity values corresponding to each of the individual labels;

determining that the new multimedia data item is one of the negative multimedia data items;

based at least in part on determining that the new multimedia data item is one of the negative multimedia data items, comparing the statistics with the similarity values corresponding to each of the individual labels; and based at least in part on comparing the statistics with the similarity values, updating individual model vectors of the plurality of model vectors.

17. One or more computer storage media as claim 16 recites, the acts further comprising:

receiving a second new multimedia data item associated with a first label of the plurality of labels;

extracting a third set of features from the second new multimedia data item;

applying the classifier to the third set of features;

based at least in part on applying the classifier to the third set of features, determining new similarity values corresponding to each of the individual labels;

determining that the second new multimedia data item is one of the positive multimedia data items;

determining that the classifier classified the second new multimedia data item as being associated with a second label of the plurality of labels, the second label being different from the first label; and adjusting at least two of the individual model vectors based at least in part on:

scaling down a first individual model vector of the individual model vectors, the first individual model vector associated with the second label; and scaling up a second individual model vector of the individual model vectors, the second individual model vector associated with the first label.

18. One or more computer storage media as claim 16 recites, wherein updating the individual model vectors comprises:

determining that a particular similarity value of the similarity values that corresponds to a particular individual label of the individual labels is greater than a particular statistic of the statistics associated with the particular individual label; and scaling down a particular individual model vector of the individual model vectors, the particular individual model vector corresponding to the particular individual label.

19. One or more computer storage media as claim 16 recites, wherein the statistics comprise one or more of:

averages of the similarity values generated when the classifier correctly identifies an individual positive multimedia data item of the individual positive multimedia data items with an individual label of the individual labels;

standard deviations of the similarity values generated when the classifier correctly identifies the individual positive multimedia data item with the individual label;

kth order statistics of the similarity values generated when the classifier correctly identifies the individual positive multimedia data item with the individual label; or distributions representative of the similarity values generated when the classifier correctly identifies the individual positive multimedia data item with the individual label.

20. One or more computer storage media as claim 16 recites, wherein:

the statistics comprise threshold values; and updating the individual model vectors is based at least in part on the similarity values being above the threshold values.

* * * * *